Figure 1:
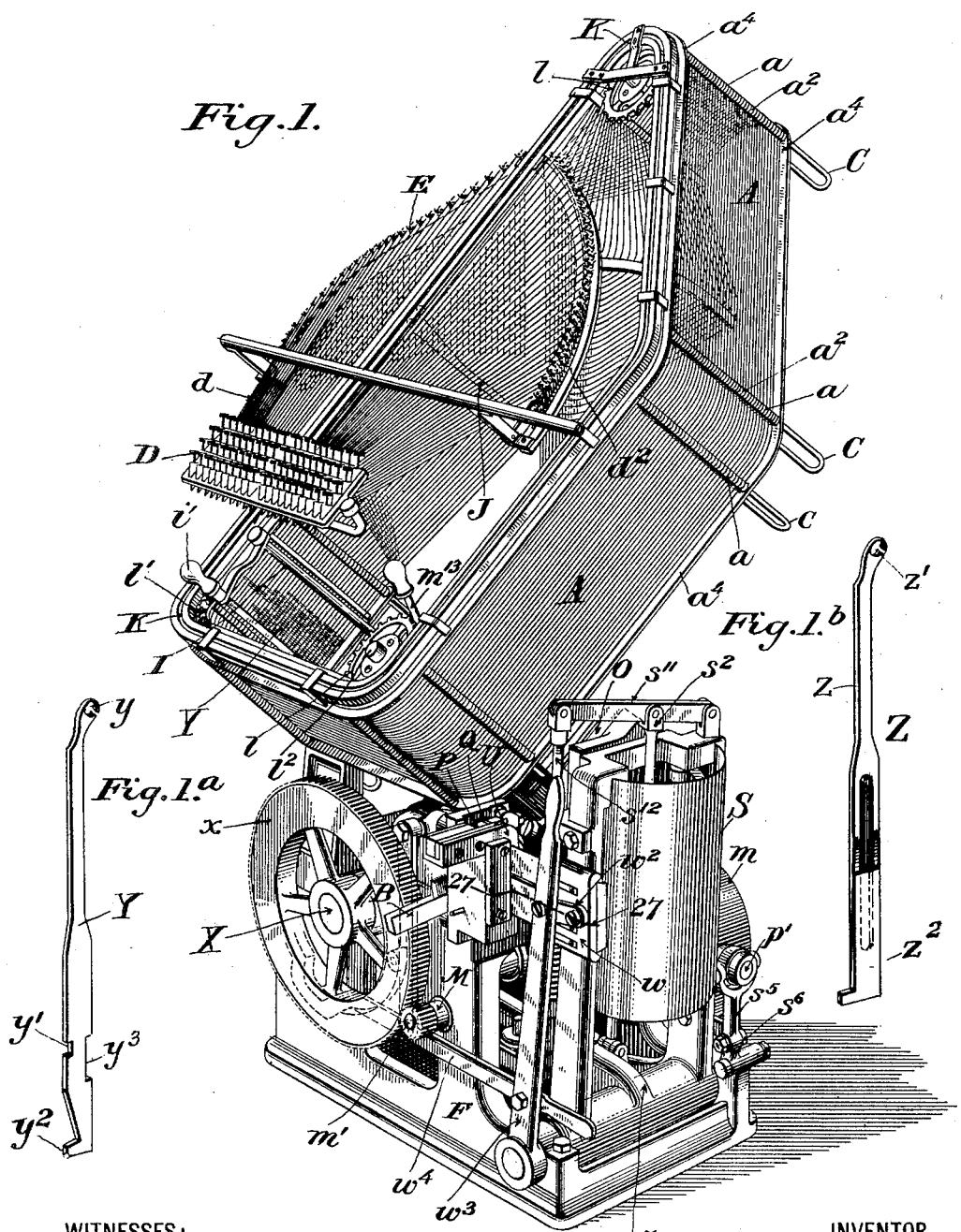

No. 679,481. Patented July 30, 1901.
J. R. ROGERS.
LINOTYPE MACHINE.
(Application filed Feb. 19, 1901.)

(No Model.) 17 Sheets—Sheet 1.

No. 679,481. Patented July 30, 1901.
J. R. ROGERS.
LINOTYPE MACHINE.
(Application filed Feb. 19, 1901.)

(No Model.) 17 Sheets—Sheet 4.

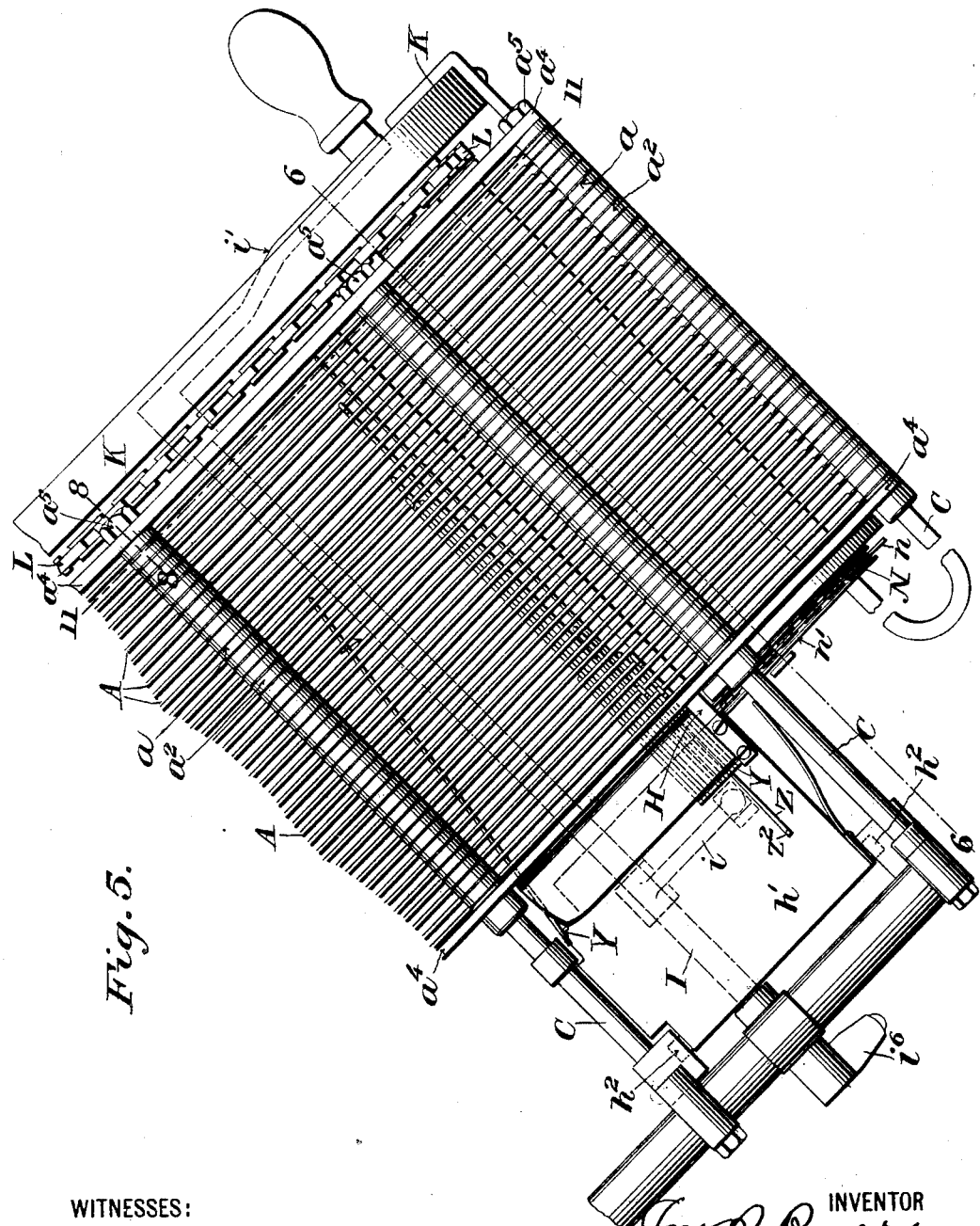

No. 679,481. Patented July 30, 1901.
J. R. ROGERS.
LINOTYPE MACHINE.
(Application filed Feb. 19, 1901.)
(No Model.) 17 Sheets—Sheet 6.
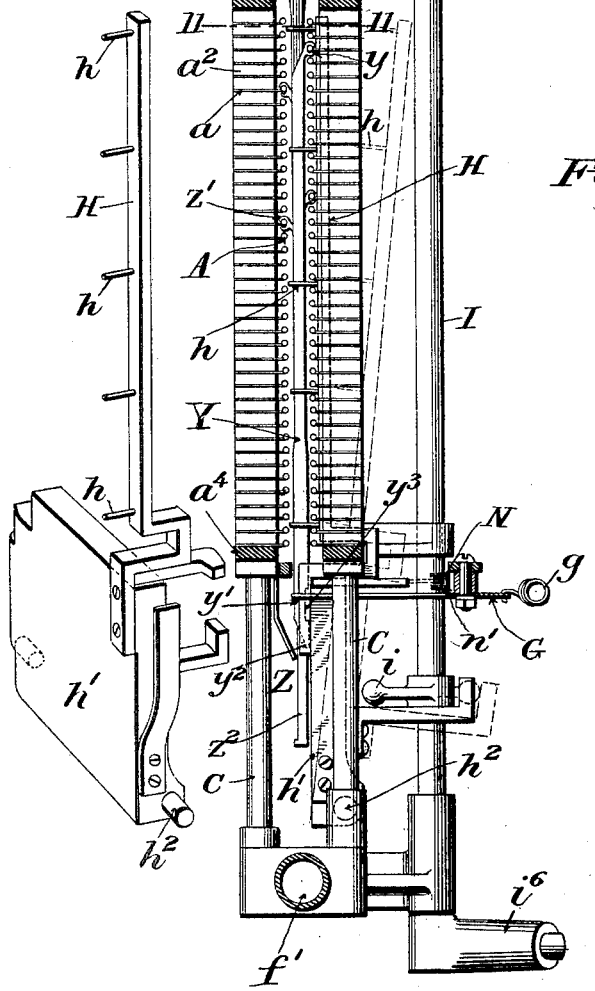
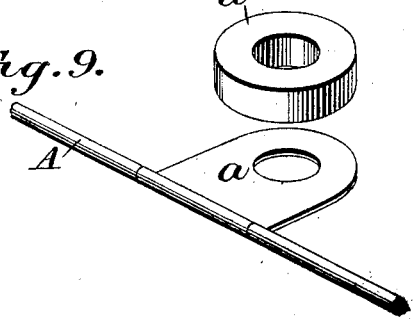
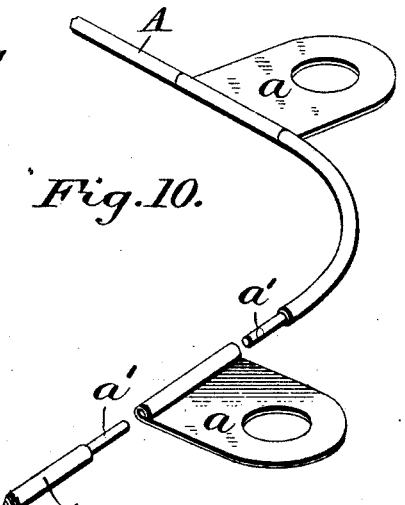
WITNESSES:
INVENTOR
Jno. R. Rogers
BY
Philip T. Dodge
ATTORNEY No. 679,481. Patented July 30, 1901.
J. R. ROGERS.
LINOTYPE MACHINE.
(Application filed Feb. 19, 1901.)
(No Model.) 17 Sheets—Sheet 7.

Witnesses:
Inventor:
Jno. R. Rogers
by Philip T. Dodge
Atty

No. 679,481. Patented July 30, 1901.
J. R. ROGERS.
LINOTYPE MACHINE.
(Application filed Feb. 19, 1901.)
(No Model.) 17 Sheets—Sheet 9.

WITNESSES: INVENTOR
Jno. R. Rogers
BY
Philip T. Dodge
ATTORNEY

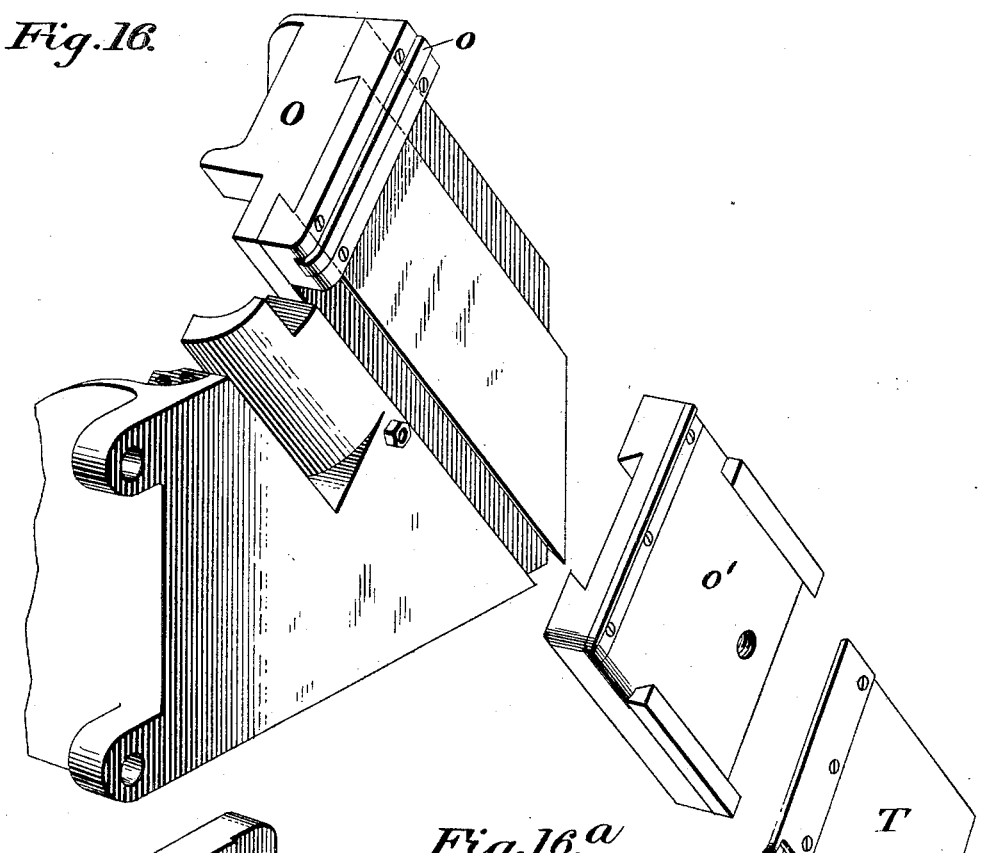
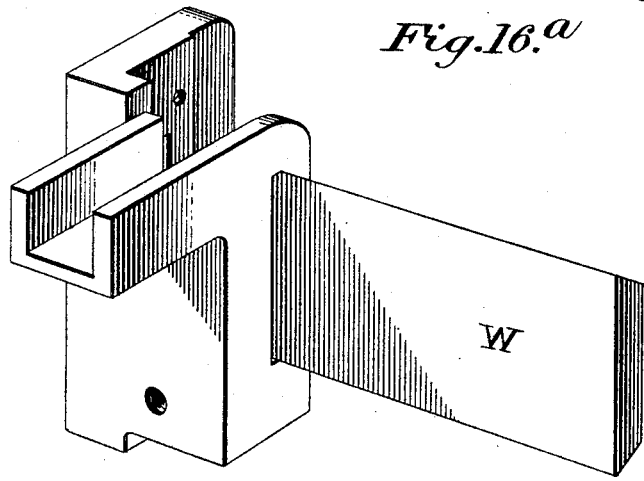

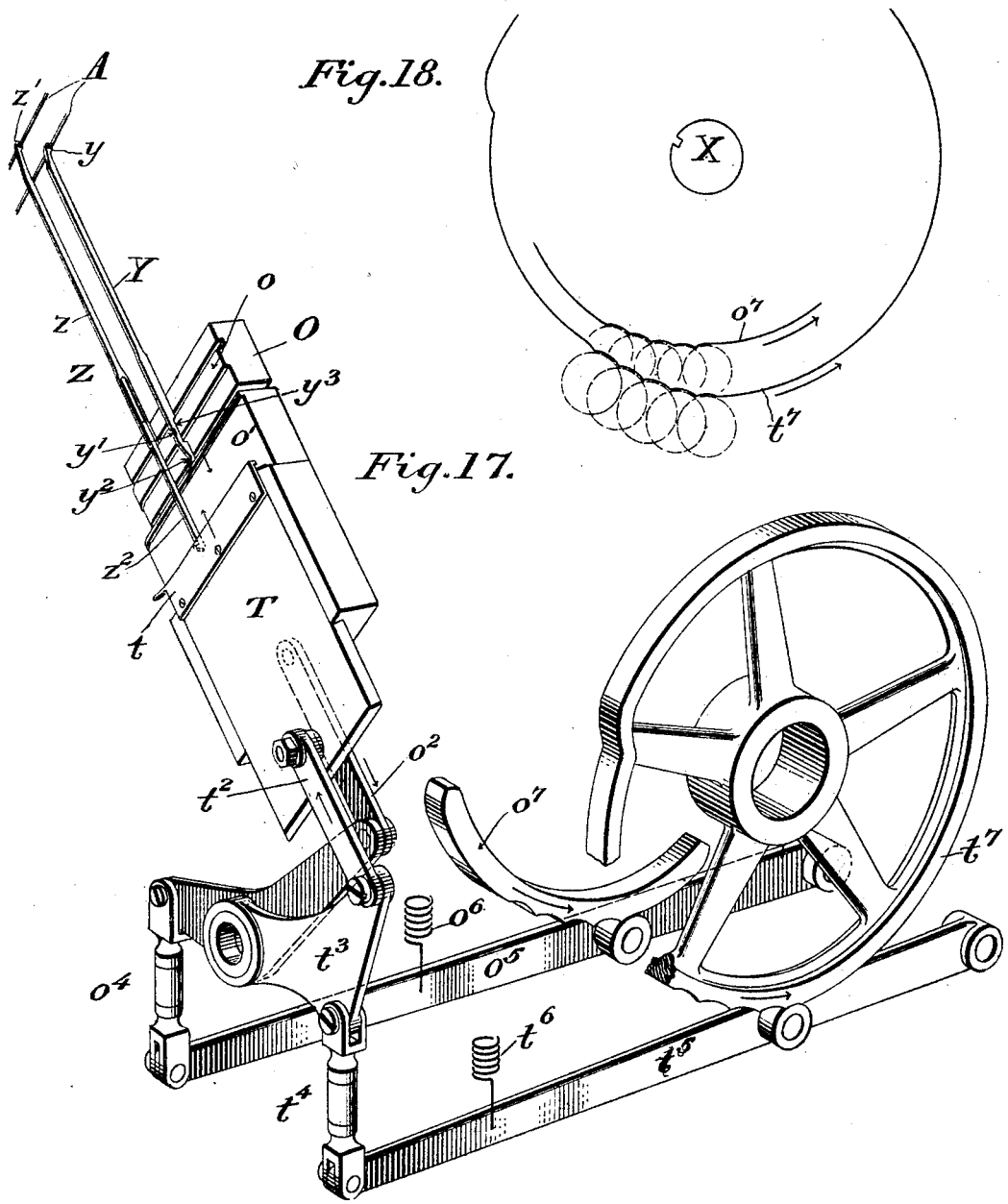

No. 679,481. Patented July 30, 1901.
J. R. ROGERS.
LINOTYPE MACHINE.
(Application filed Feb. 19, 1901.)
(No Model.) 17 Sheets—Sheet 12.

WITNESSES: INVENTOR
Jno. R. Rogers
BY
Philip T. Dodge
ATTORNEY

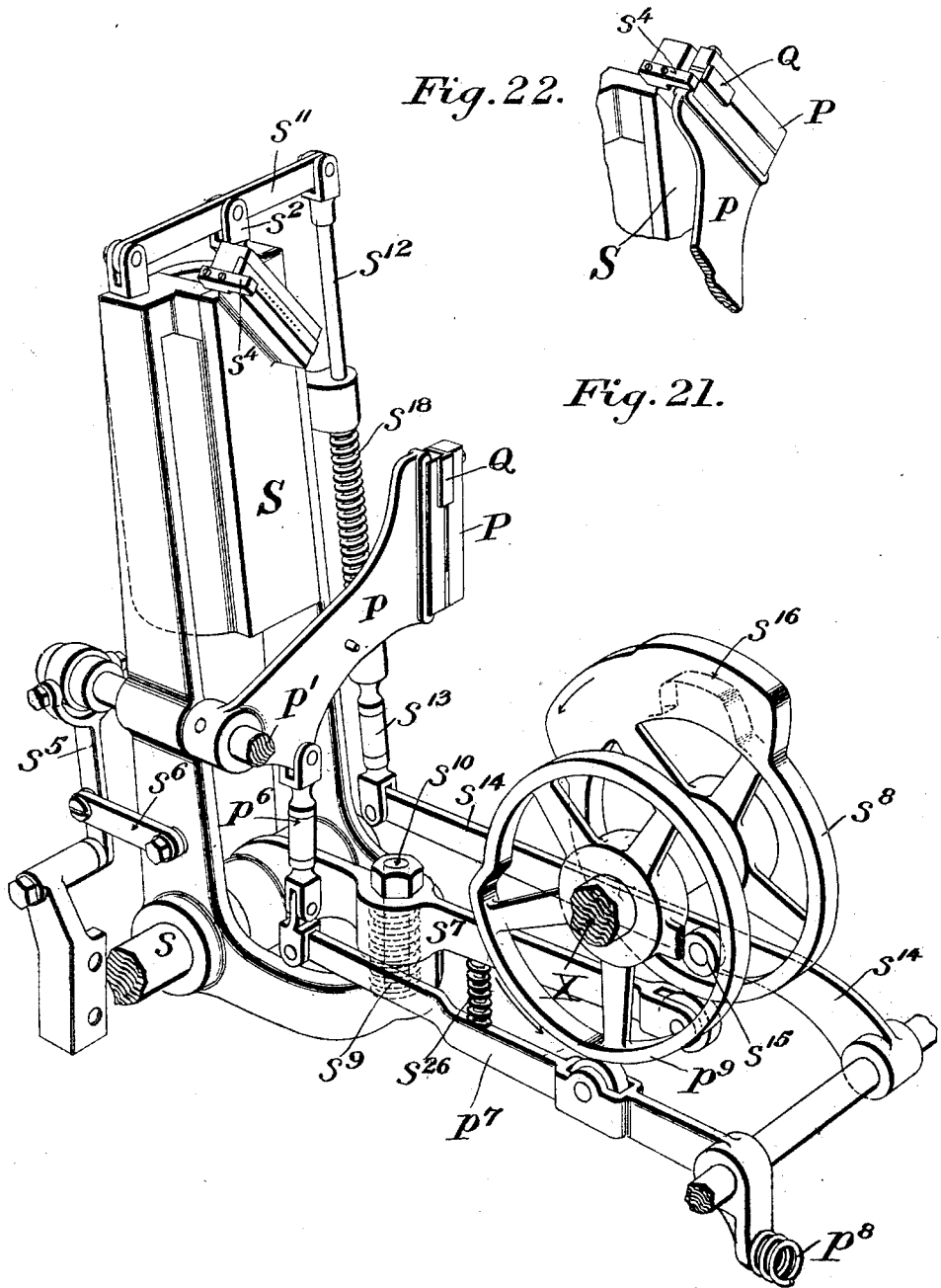

No. 679,481.  
J. R. ROGERS.  
LINOTYPE MACHINE.  
(Application filed Feb. 19, 1901.)  
Patented July 30, 1901.

(No Model.)

17 Sheets—Sheet 14.

WITNESSES:

INVENTOR  
Jno. R. Rogers  
BY Philip T. Dodge  
ATTORNEY

No. 679,481. Patented July 30, 1901.
J. R. ROGERS.
LINOTYPE MACHINE.
(Application filed Feb. 19, 1901.)
(No Model.) 17 Sheets—Sheet 15.

WITNESSES:

INVENTOR
Jno. R. Rogers
BY Philip T. Dodge
ATTORNEY

No. 679,481. J. R. ROGERS. Patented July 30, 1901.
LINOTYPE MACHINE.
(Application filed Feb. 19, 1901.)

(No Model.) 17 Sheets—Sheet 16.

Witnesses Inventor,
Jno. R. Rogers
by Philip T. Dodge
Atty.

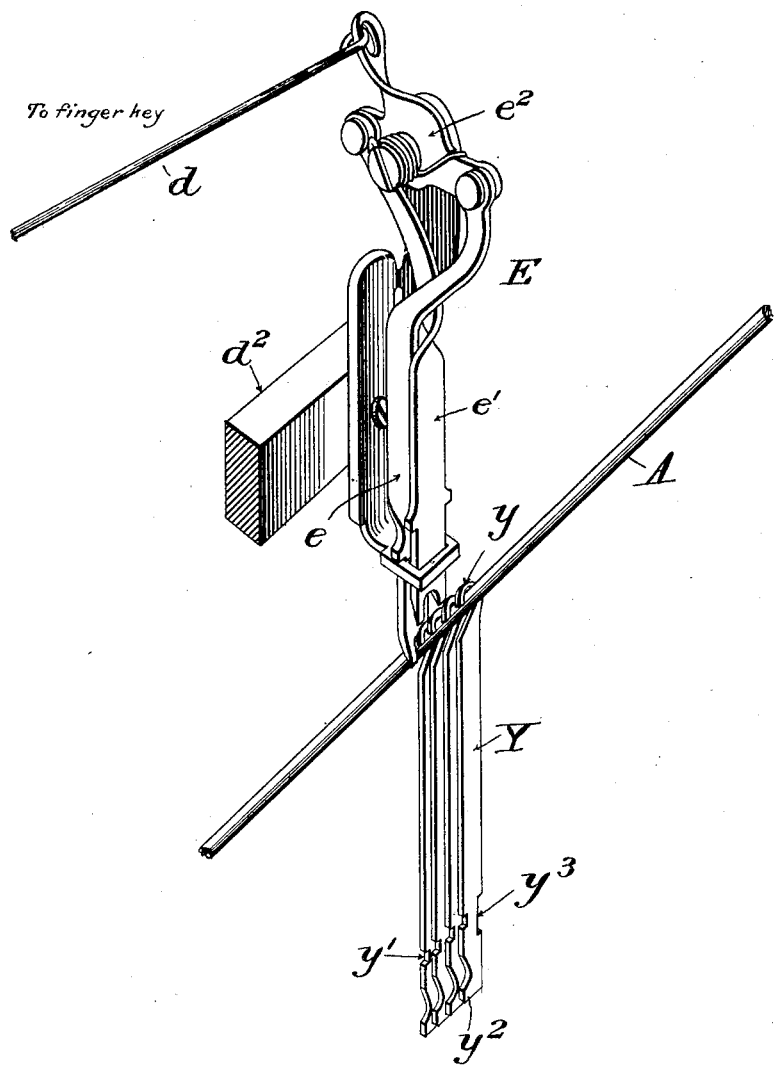

UNITED STATES PATENT OFFICE.

JOHN R. ROGERS, OF BROOKLYN, NEW YORK, ASSIGNOR TO MERGENTHALER LINOTYPE COMPANY, OF NEW YORK.

LINOTYPE-MACHINE.

SPECIFICATION forming part of Letters Patent No. 679,481, dated July 30, 1901.

Application filed February 19, 1901. Serial No. 47,992. (No model.)

*To all whom it may concern:*

Be it known that I, JOHN R. ROGERS, of Brooklyn, county of Kings, and State of New York, have invented a new and useful Improvement in Linotype-Machines, of which the following is a specification.

My invention has reference to linotype-machines in which a series of letter-matrices assembled temporarily in line are presented to close one side of a mold-slot, into which molten type-metal or equivalent material is delivered to form a slug or linotype on which the type characters are produced by the matrices.

The invention has reference more particularly to improvements on the machine shown in United States Letters Patent No. 630,412, issued to me on the 8th day of August, 1899, wherein the matrices are suspended from endless guides, which latter are arranged at one point of their length in converging lines for the purpose of assembling the selected matrices in a common line and at another point in their length in diverging lines for the purpose of distributing the matrices after they have been used at the mold.

The present invention includes, among other features, an improved manner of constructing and supporting the endless guides for the matrices, an improved arrangement of devices for insuring the proper assemblage of the released matrices in a common line, expansible wedge spacers of improved construction for use in the lines of matrices, means for transferring the composed lines from the point of assemblage to the casting-point, and improved casting mechanism, including means for confining the matrix-lines, for effecting the adjustment of the spacers, for delivering molten metal into the mold, and for effecting the requisite movements of the mold and ejecting devices.

Figure 2:
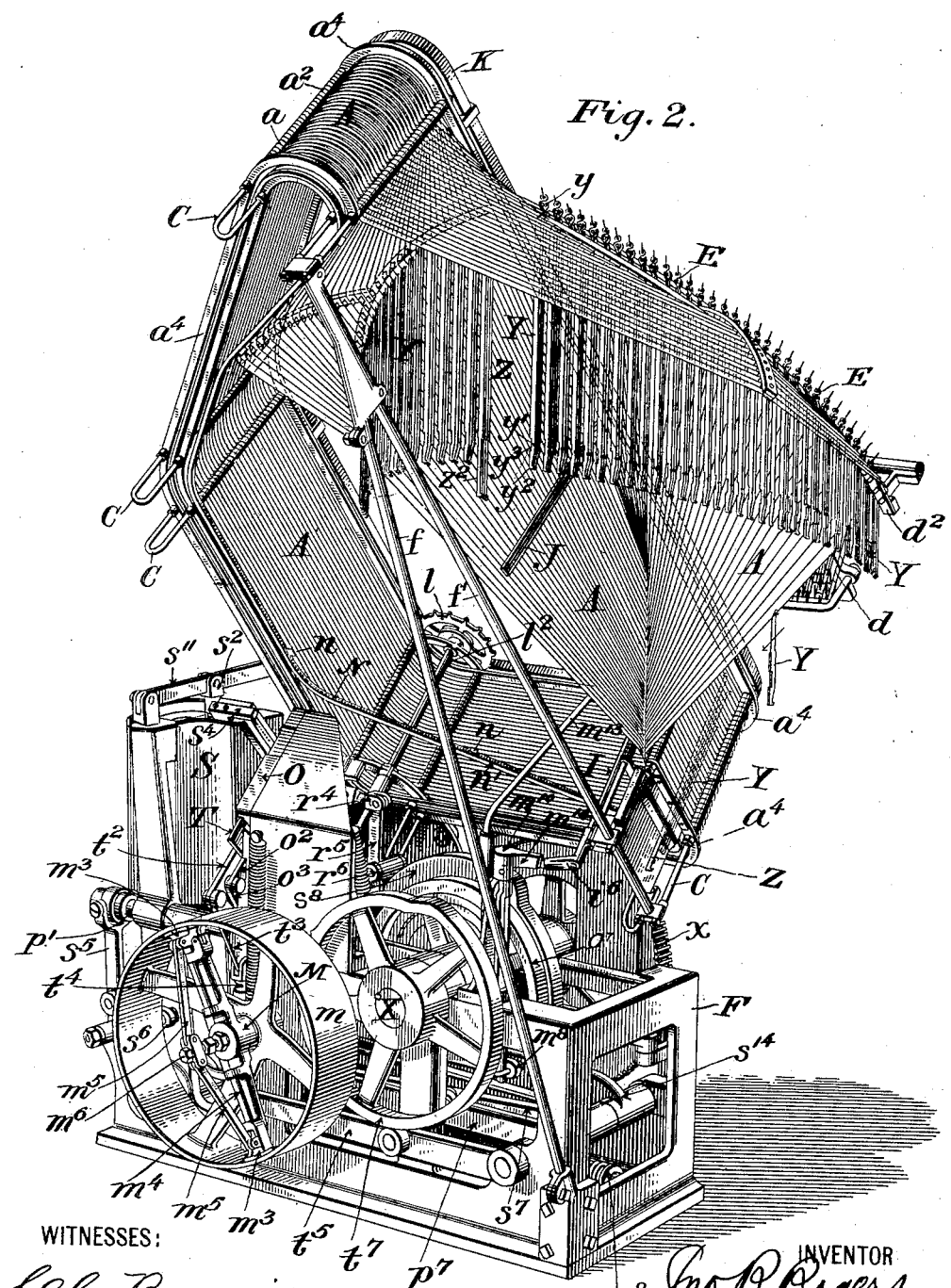
Figure 3:
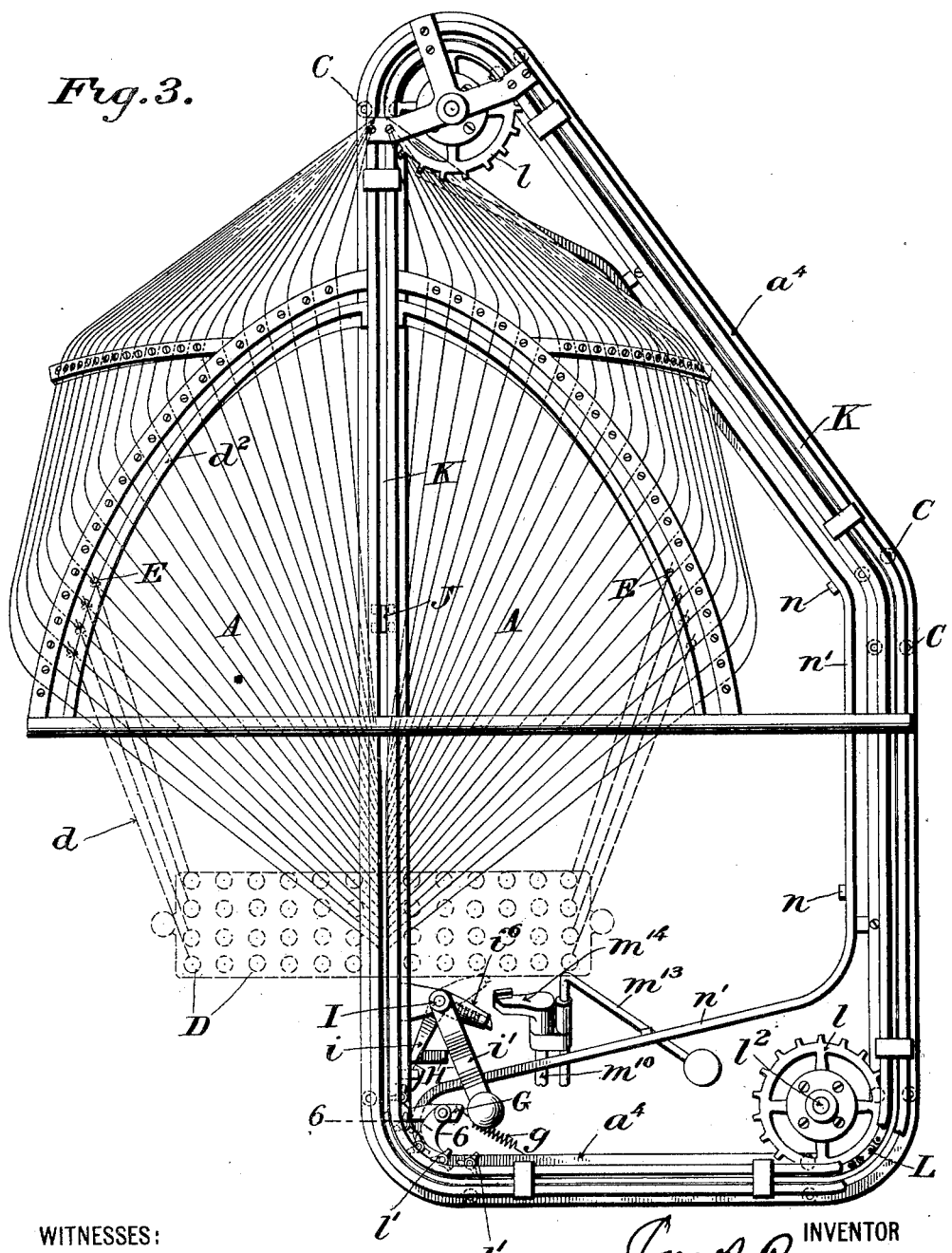
Figure 4:
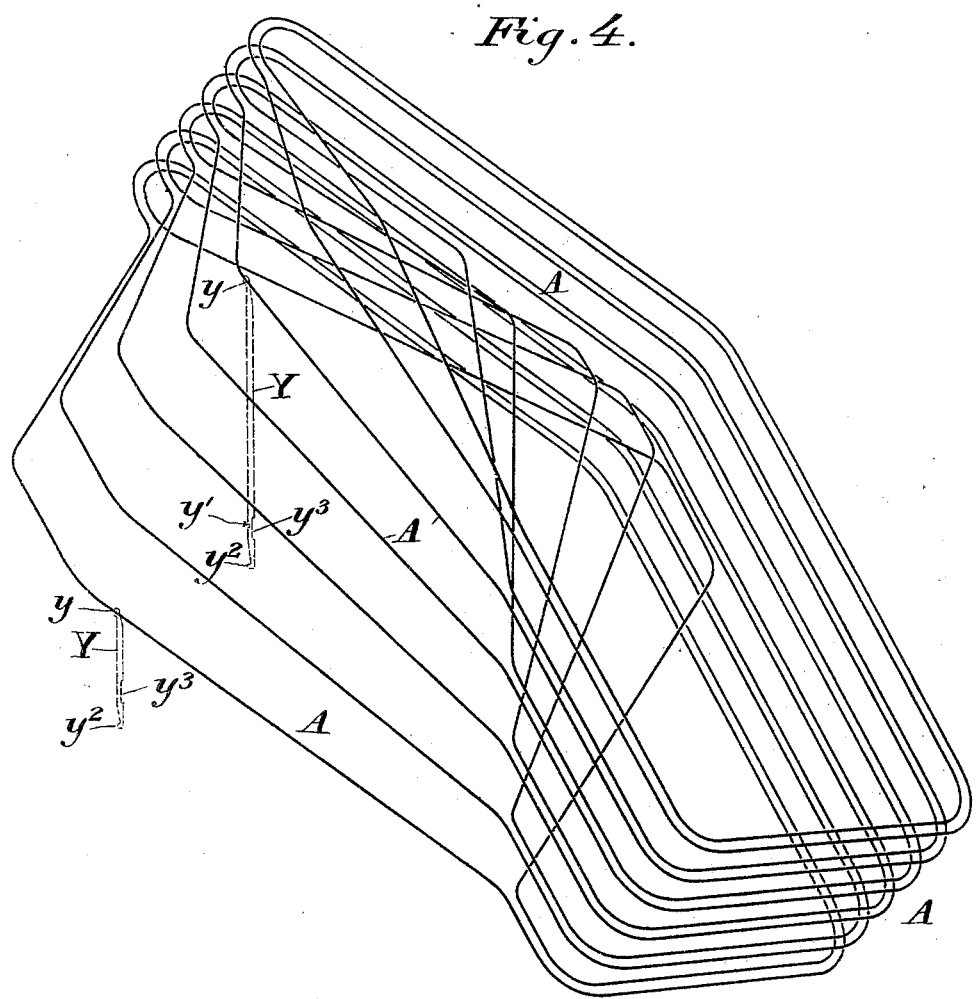
Figure 11:
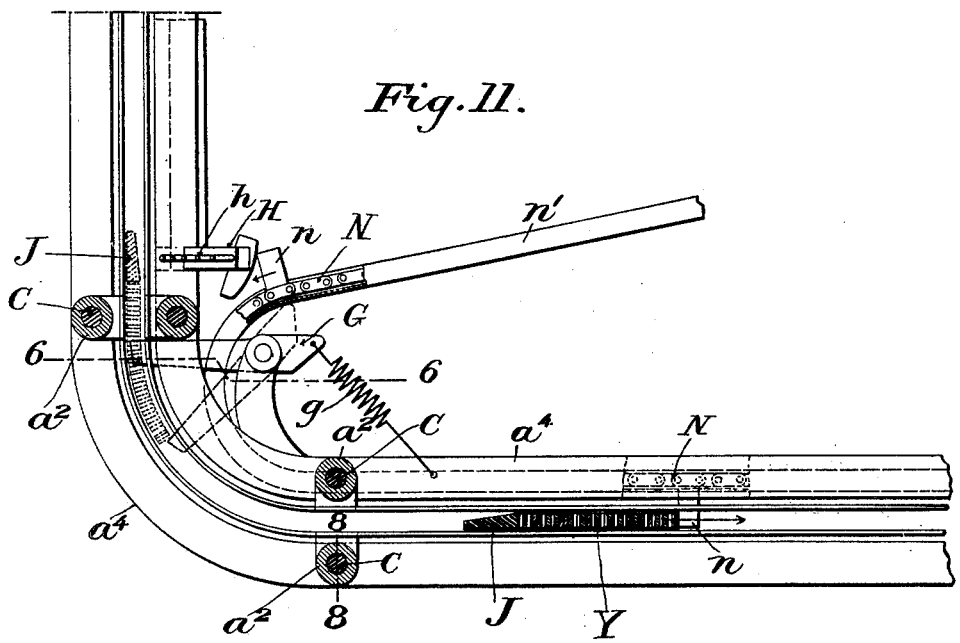
Figure 12:
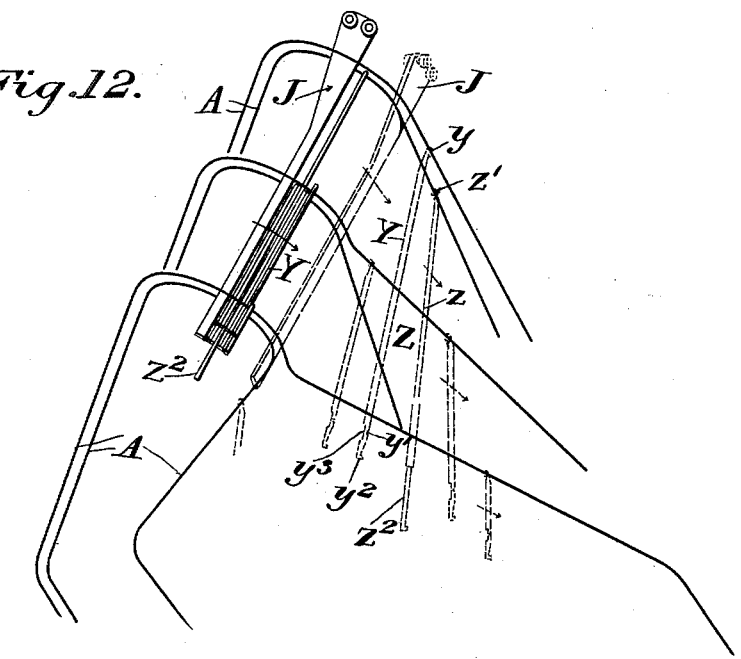
Figure 13:
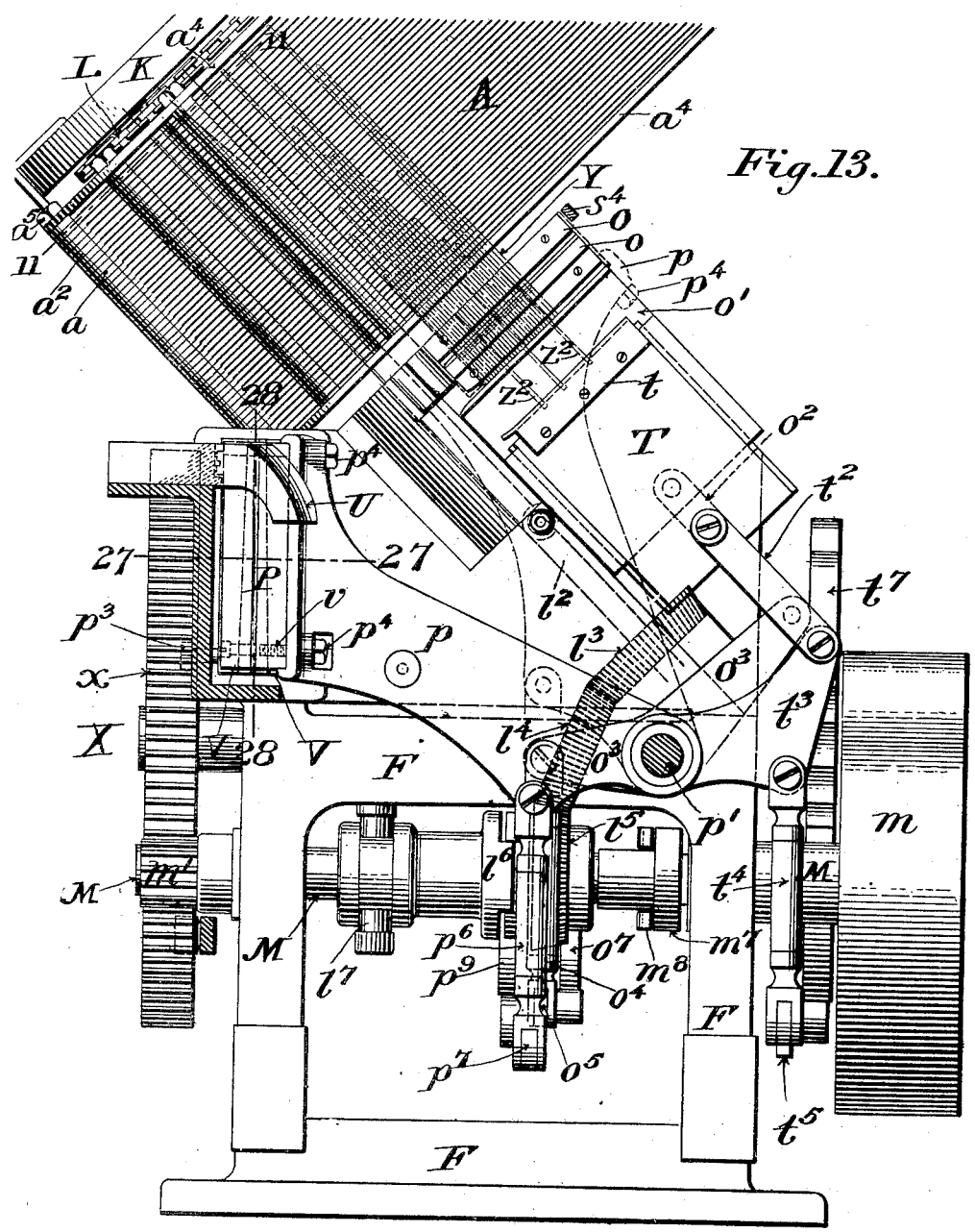
Figure 15:
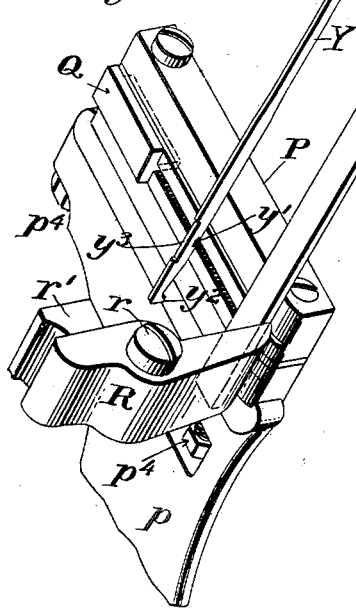
Figure 14:
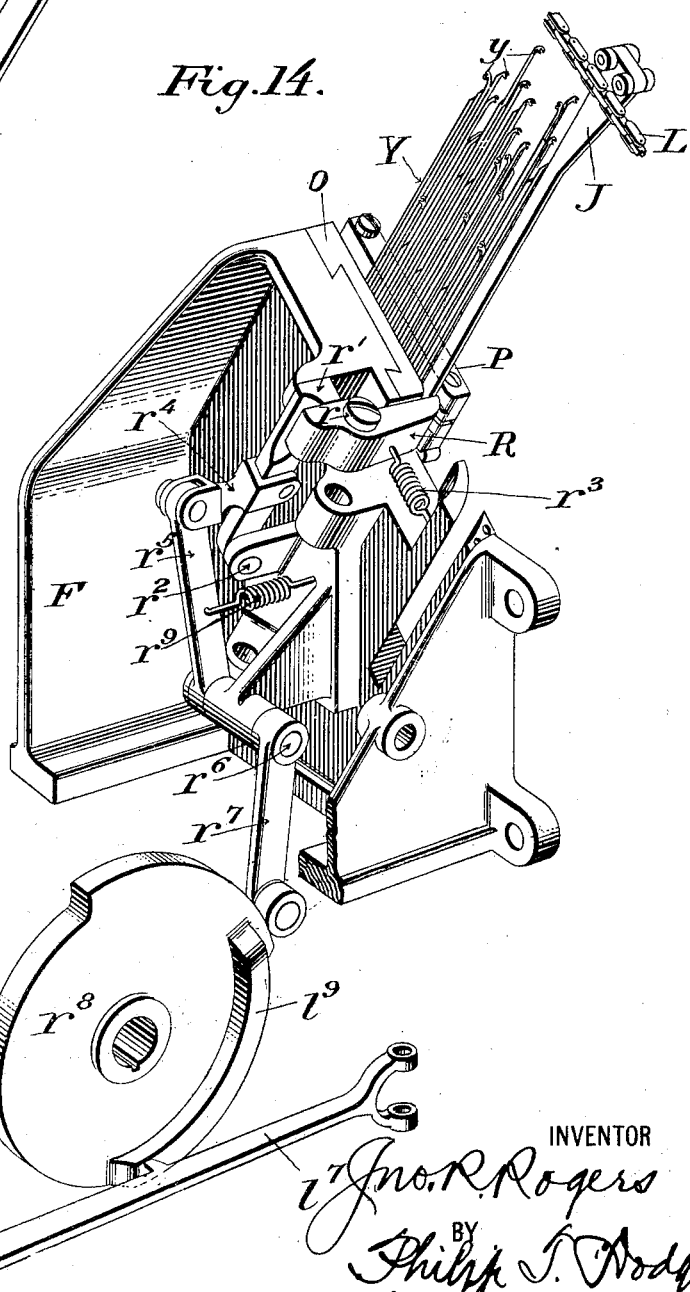
Figure 19:
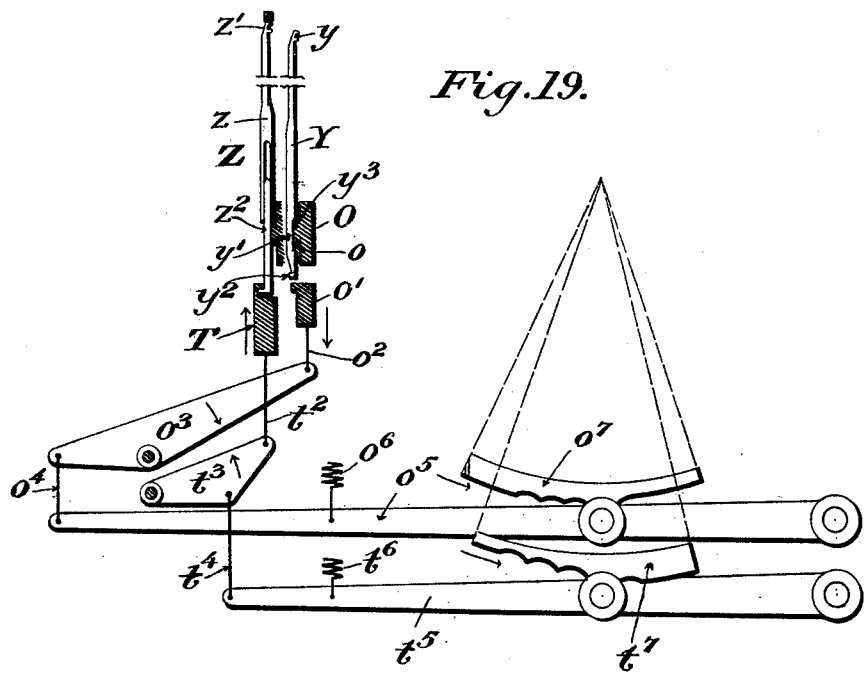
Figure 20:
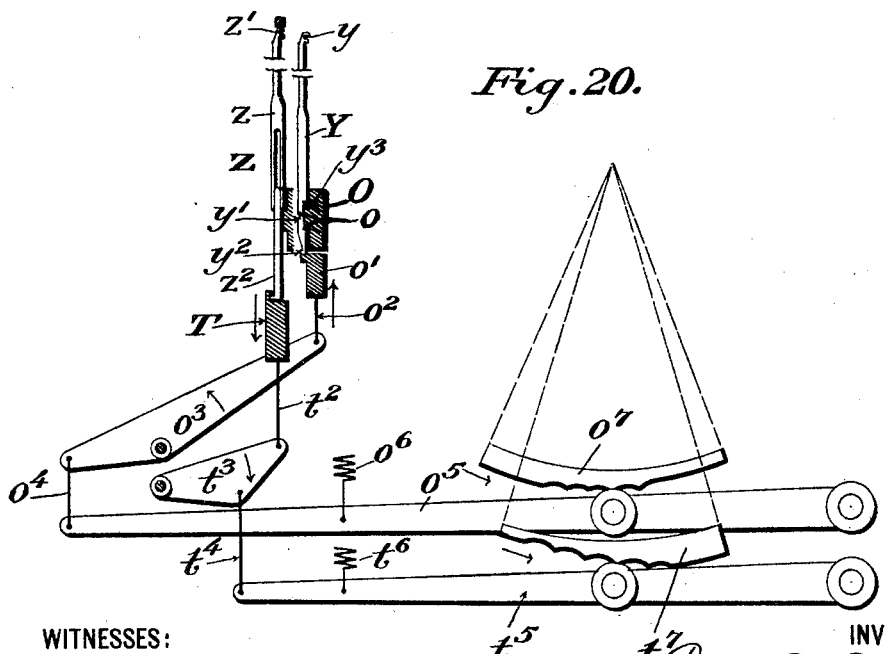
Figure 23:
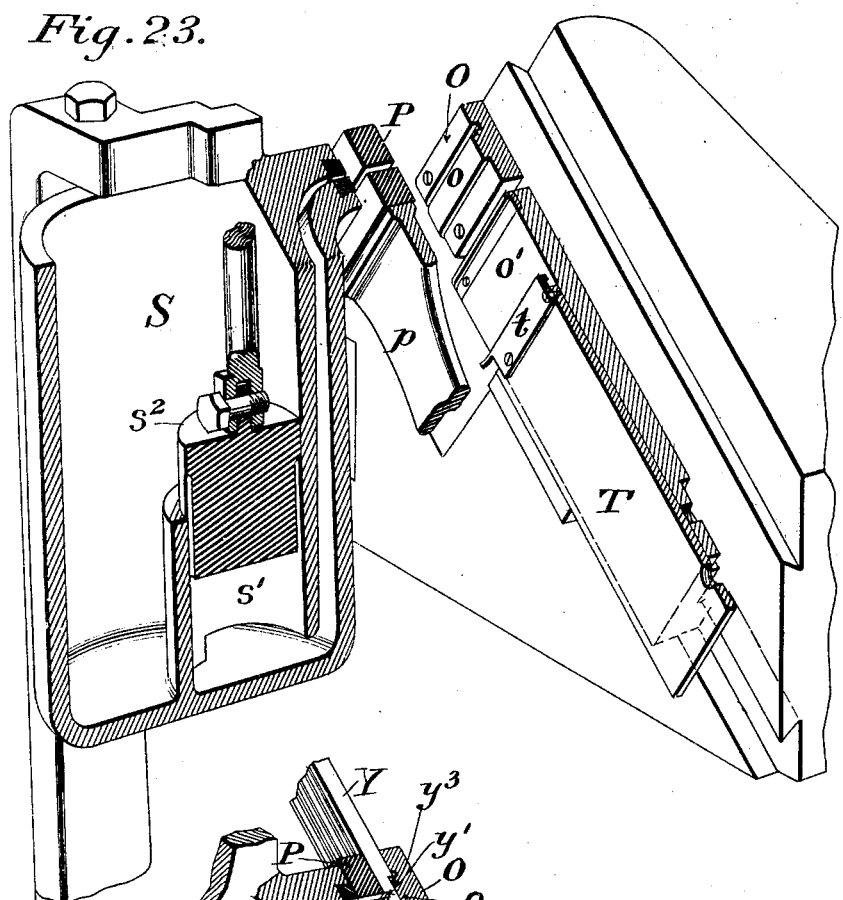
Figure 24:
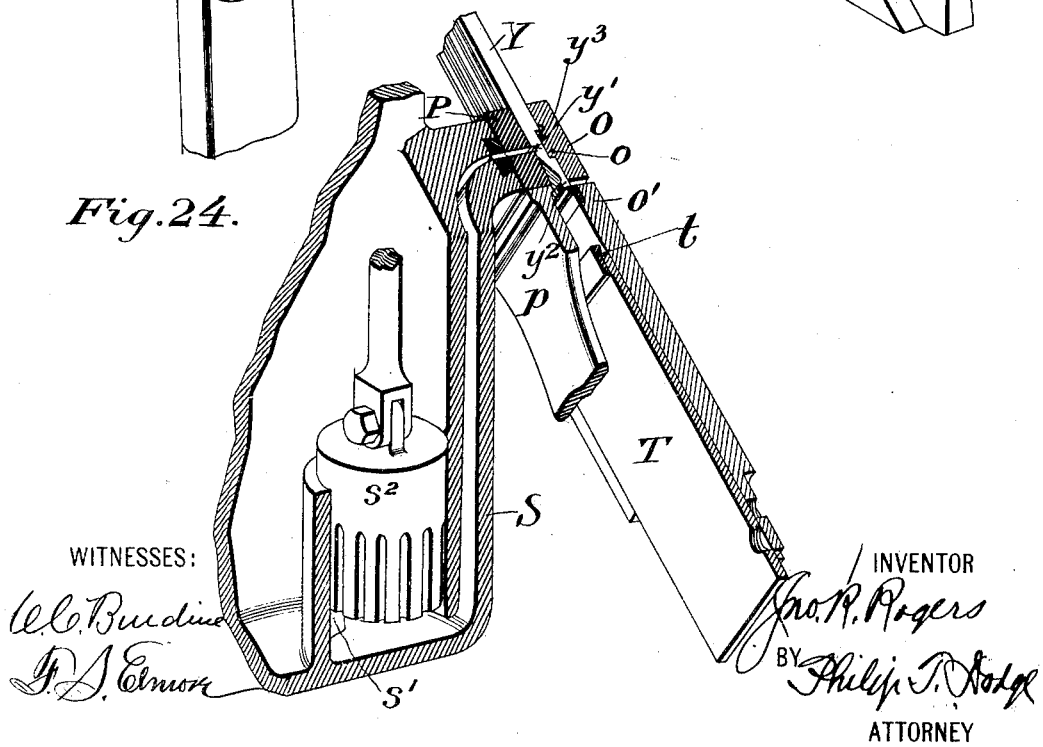
Figure 25:
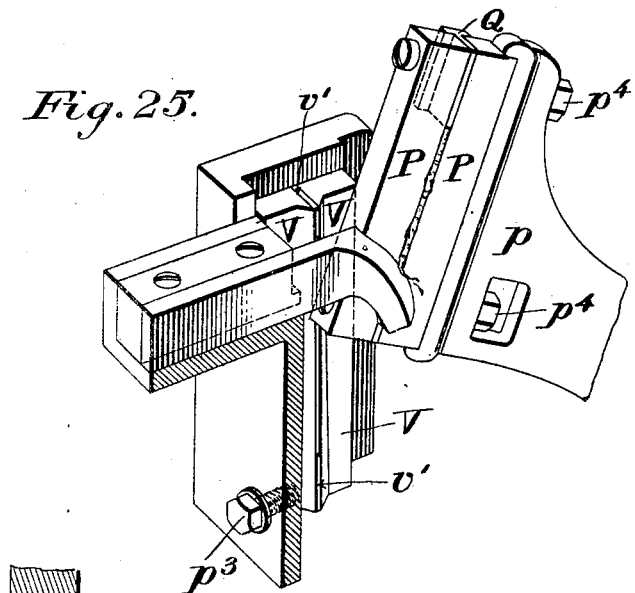
Figure 26:
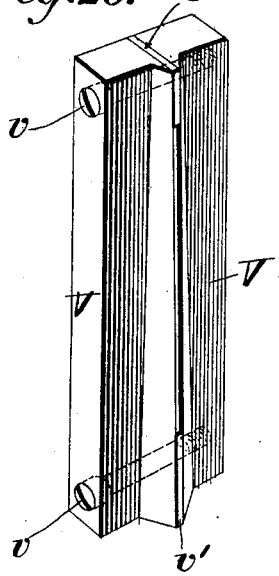
Figure 27:
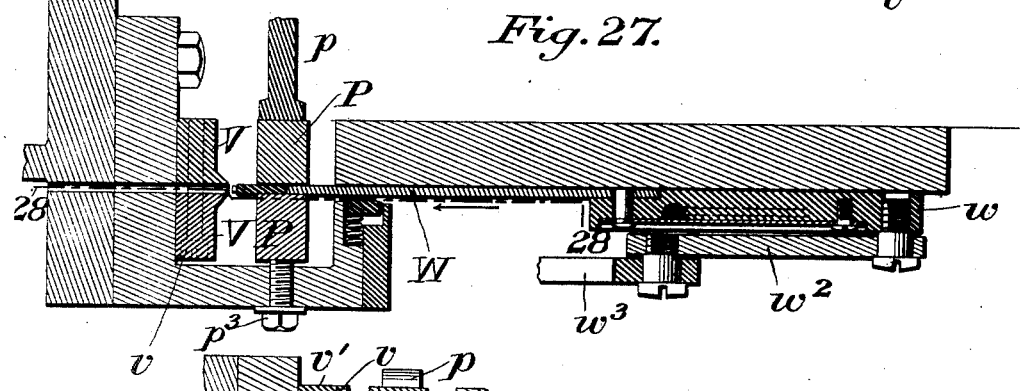
Figure 28:
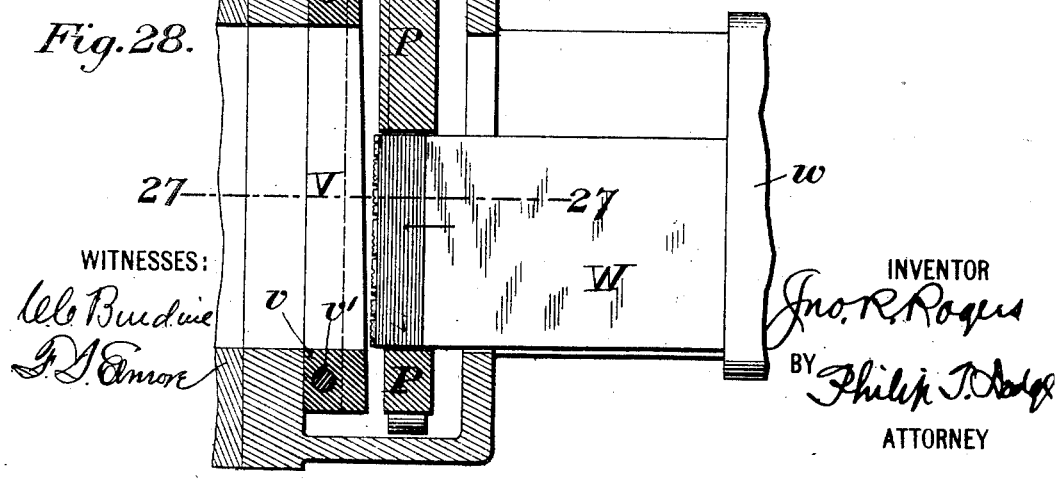
Figure 29:
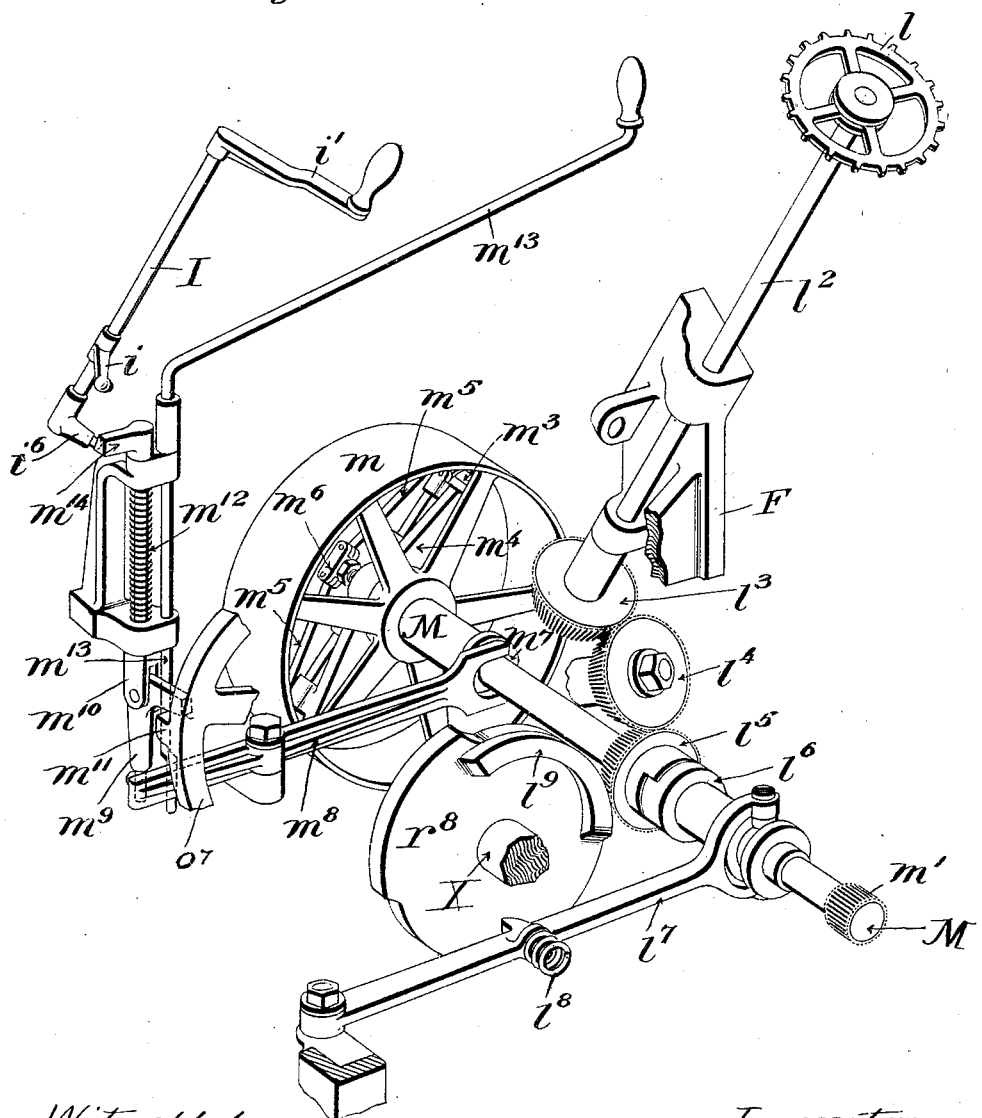

Figure 1 is a perspective view of my machine looking toward the forward right-hand corner. Fig. 1ª is a perspective view of one of the matrices, and Fig. 1ᵇ a perspective view of one of the space-bands. Fig. 2 is a perspective view from the rear looking toward the right-hand corner. Fig. 3 is a top plan view illustrating more particularly the arrangement of the endless guides, keyboard, and means for transferring the matrix-lines. Fig. 4 is a perspective view from the left illustrating a group of matrix-sustaining wires or guides on one side of the machine, showing more particularly their form and arrangement in relation to each other. Fig. 5 is a side view from the left of the lower ends of the assembling-wires and the parts immediately associated therewith for gathering the matrices into a compact line. Fig. 6 is a vertical section through the ends of the matrix-guides and assembling devices on the line 6 6 of Figs. 3, 5, and 11. Fig. 7 is a perspective view of parts shown in the preceding figure for arresting the matrices during the assemblage or composition of the line. Fig. 8 is a vertical section illustrating the manner in which the series of matrix-guiding wires are sustained in relation to each other, the section being taken on the line 8 8 of Figs. 6 and 11. Fig. 9 is a perspective view illustrating separately parts shown in the preceding figure. Fig. 10 is a perspective view illustrating the manner in which the endless matrix-guides are built up in sections and the sections connected by the supporting-plates or otherwise, as in the two preceding figures. Fig. 11 is a horizontal cross-section on the line 11 11 of Figs. 5, 6, and 13 looking in a downward direction and showing more particularly the means for holding the composed line of matrices, releasing the completed line and moving the same forward toward the casting mechanism. Fig. 12 is a perspective view illustrating the manner in which the carrier-finger advances the line of matrices around the upper curved ends of the guides, so that they may descend by gravity for the purposes of distribution on the diverging portions of the guides. Fig. 13 is a side elevation, looking from the right, of the lower ends of the matrix-guides with attendant parts, including means for clamping the matrices, for actuating the spacers or justifiers and the mold, the pot and connected parts being removed in order to expose other parts to view. Fig. 14 is a perspective view showing the composed line of matrices in position against the mold, together with devices for confining the latter, the adjacent portions of the framework being broken away to expose the parts to view. Fig. 15 is a perspective view illustrating the inner or forward face of the mold, a matrix in position in front of the same, the means for confining the line of matrices, with a finger for transferring the advancing line. Fig. 16 is a perspective view illustrating, separated from each other, the devices for alining the matrices and actuating the spacers or justifiers, these parts being viewed from the forward right-hand corner. Fig. 16ᵃ shows a casting supporting the ejector and trimming-knives. Fig. 17 is a perspective view looking from the left, illustrating the devices for supporting the matrices and spacers, for effecting the alinement of the former, and for effecting the movement of the latter to secure justification. Fig. 18 is a diagram illustrating the construction and operation of the cams in the foregoing figure. Figs. 19 and 20 are diagrammatic views illustrating the actions of the cams and adjacent parts for effecting the exact alinement of the matrices in front of the mold and for actuating the spacers or justifiers, the spacers and their attendant parts being in these views arbitrarily separated to show more clearly their action. Fig. 21 is a view looking toward the left and from the rear, showing particularly the melting-pot and its delivery-mouth, the coöperating mold, and the means for effecting their movements, the mold being swung down in position to permit the ejection of the slug therefrom. Fig. 22 is a perspective view showing the mold elevated to the casting position in front of the pot-mouth. Fig. 23 is a perspective view looking in a forward direction from the left and showing in section the pot, the coöperating mold, and the means for alining and adjusting the matrices and spacers. Fig. 24 is a similar view showing the parts closed together in operative relation with the line of matrices confined in place. Fig. 25 is a perspective view looking rearward toward the left, showing the knives for trimming the sides and base of the slug, together with the mold in the act of presenting the slug to the knives. Fig. 26 is a perspective view showing a pair of trimming-knives removed from the machine. Fig. 27 is a cross-section in an approximately horizontal plane through the knives, the mold, and the ejector in the act of delivering and trimming a slug, the section being taken on the line 27 27 of Figs. 1, 13 and 28. Fig. 28 is a section in a substantially vertical plane, through the parts represented in the preceding figure, on the line 28 28 of Figs. 13 and 27. Fig. 29 is a perspective view looking rearward and toward the right, showing the principal driving parts through which motion is imparted to the operative members. Fig. 30 is a perspective view illustrating one of the escapements for holding a group of matrices in reserve and releasing them one at a time.

My machine is based upon the use of and is intended to handle in the required manner matrices Y and spacers Z, such as shown in Figs. 1ᵃ and 1ᵇ, respectively, it being the office of the composing and distributing mechanism to select the matrices and spacers in the required order, assemble them temporarily in line, transfer the line to the casting mechanism, and thereafter effect the distribution of the matrices and spacers to their original points of storage or detention.

Each matrix Y consists of a slender metal strip having at its upper end a hook or eye $y$, by which it is suspended from the appropriate wire in the machine in order that it may travel thereon to the different positions required.

In the front edge of each matrix, near the lower end, a female character or matrix proper, $y'$, is formed, and at a lower point in the same edge a shoulder $y^2$ is formed, while on the opposite edge, directly opposite to the matrix proper, there is a recess or depression having square shoulders at the upper and lower ends.

All matrices bearing the same character are alike in form and dimensions and all matrices in the machine are of equal width from one edge to the other, so that they may be assembled side by side in a compact line in order to close the face of the mold to which they are presented in action.

Matrices containing different characters are made of different lengths—for example, those bearing the character "A" of one length and those bearing the character "B" of another length, and this in order that the characters in the lower ends of the composed or assembled line of matrices will stand in exact alinement, although the upper ends of the respective matrices may be sustained by wires or guides at different heights or levels. Inasmuch, however, as there are two guides at each level, one on the right of the machine and the other on the left, it follows that the matrices bearing one character may be of the same length as matrices bearing another character at the opposite side of the machine. In other words, there may be two sets of matrices of each length, one set all bearing the same character and run in the right side of the machine on one guide and the other set all bearing another character and run in the left side of the machine on another guide.

The expansible spacers Z are intended to coöperate with the matrices in the composed line and to expand the lines endwise to the predetermined length after the last word or syllable has been included. They consist each of an upper portion or body $z$, having at the upper end an eye or ear $z'$, by which the space is suspended from one of the guides, so that it may travel thereon in the same manner that the matrices travel, and of a lower portion or web $z^2$, arranged to slide longitudinally within a dovetail or corresponding groove in the side of the upper or body portion. The groove or recess in the body is inclined laterally to correspond with the taper of the wedge, so that the two parts jointly constitute a space variable in thickness, the outer or opposite sides of which are at all times parallel. The thickness of the operative portion of the space—that is, the portion which for the time being is in line with the characters in the matrices at the casting-level—is increased by pushing the wedge portion upward in relation to the body, as will be hereinafter more fully explained.

Referring now to the general construction of the machine, A A represent a series of stationary endless inclined guide-wires, from which matrices and spacers are suspended and around which they are free to travel, one or more wires being devoted to the spacers and each of the other wires devoted to a group of matrices containing one and the same character. These endless guide-wires or guides correspond to the endless tubular guides B of Patent No. 630,412, and the respective guides are bent into essentially the same forms and arranged in essentially the same relation to each other as the guides of the patent, being widely separated at certain points in their length and brought closely together at other points, so that the selected and released matrices traveling on the converging portions of the guides are first brought together in a common or composed line and after being used are distributed to their first positions by continued travel over the diverging portions of the guides. Beginning at the upper end, as shown in Fig. 3, the guides diverge right and left from a central point to such extent that the group of matrices suspended from one wire will not interfere with the travel of those suspended on the adjacent wire, the respective wires on each side of the machine being carried outward different distances from the center. From their points of greatest divergence the wires converge toward the lower front end of the machine, being finally arranged, as shown in Figs. 2 and 6, in two parallel vertical tiers or ranks separated a distance substantially equal to the width of the matrices, so that the successive matrices sliding downward on the respective wires will follow each against its predecessor, thus forming a composed line, as shown in Figs. 3 and 13, bearing all the characters required in one line of print. From the point at which the matrices are thus assembled the guides are continued, as shown particularly in Figs. 1 and 3, in two parallel ranks downward and forward, then to the right, then rearward first in a right line, and finally to the left, until the top of the machine is reached, when the guides are deflected to the right and left, as before described.

It will of course be understood that the respective guides are not only arranged to diverge laterally, but that they are arranged at different heights or levels. In order that the guides may be made continuous and properly supported, so as to present a smooth and uninterrupted surface for the travel of the matrix-ears thereon, I adopt the construction shown in Figs. 8, 9, and 10, in which it will be seen that each guide is supported at suitable points in its length by a plate $a$, having one edge of tubular form and of a diameter equal to that of the guide, which is divided and provided with tenons $a'$, inserted into the opposite edges of the supporting-plate and braced or otherwise secured therein, so that the supporting-plate becomes, in effect, a part of the guide, its end surface being flush with the guide, so that the hooks or ears of the matrices may pass thereover without hindrance, as plainly shown in Fig. 8.

In building up the machine I sustain the guides where they lie parallel by slipping the plates $a$ onto vertical rods or bolts C and applying washers or spacing-pieces $a^2$ between them. In this manner the parts are tied strongly together and a firm support is given to the guides, while at the same time they are separated vertically to the extent necessary in order to permit the passage of the matrices, as seen in Fig. 8. The sustaining-rods C for the outer side of the machine are made of U form, as shown in Figs. 1, 2, and 5, one end to sustain the guides on the left and the other to sustain those on the right. They thus serve to maintain the proper distance between the two vertical tiers of guides. Their lower ends are carried down to such distance that the suspended matrices may pass through the middle.

For the purpose of giving rigidity to the entire system of guides I employ rigid endless top and bottom frames $a^4$, (see Figs. 2, 5, 6, 8, &c.,) through which the vertical rods C are passed, the frames, guide-supporting plates, and washers $a^2$ being all bound together by means of nuts $a^5$ applied to the upper ends of the rods C.

The groups of matrices and the group of spacers are held normally at rest on the respective guides at their points of greatest divergence about midway of their length, as in my previous machine, and they are released one at a time in order that they may travel downward to the point of composition by means of finger-keys D, each connected by wires $d$ to a corresponding escapement device E, one of which is sustained over each guide by a rigid cross-bar $d^2$ common to the series. The escapement device, which serves to hold back the group of matrices and to release one at a time in order that it may descend to its place in the line, may be of any suitable construction; but I prefer to retain the construction heretofore used in typograph-machines and represented in Fig. 30 of the drawings. These escapements consist of two vertically-guided pawls $e$ and $e'$, connected at opposite ends by a centrally-pivoted actuating-lever $e^2$. The lower ends of the pawls are forked to straddle the guide-wire, and the arrangement is such that they rise and fall alternately, the foremost pawl rising to release the foremost matrix, while the other pawl retains the group of matrices at rest. When the motion is reversed, the forward pawl descends and the rear pawl rises to permit the advance of the matrices until the one at the front is arrested by the forward pawl. Whenever the finger-key is depressed, it follows that the connected escapement will permit one matrix to descend by gravity on the guide to the assembling-point.

The entire system of guides is sustained on a rigid base-frame F, which may be of any form and construction adapted to sustain the various operative parts. As shown in the drawings, the frame carrying the guides is seated at its lower forward side directly on top of the base-frame and bolted thereto, while the rear elevated end of the guide-frame is sustained by two lugs or braces $f f'$, the former extending from the lower rear side of the base-frame and the latter extending downward through plates on the lower ends of the rods or bolts C, as shown in Fig. 2.

In order that the released matrices and spacers descending the guides may be arrested between the parallel ends of the latter in compact order, I provide, as shown in Figs. 3, 6, 11, &c., a stop-finger G, pivoted to a fixed support to swing parallel with the guides. A spring $g$ (see Fig. 11) acting on this stop holds it normally in the position shown in the path of the descending matrices, so that they will be arrested by it. When the composition of the matrix-line is completed and it is crowded forward to the casting mechanism, the stop-finger yields, as indicated in dotted lines in Fig. 11, allowing the line to pass. As an additional means of insuring the proper position of the matrices during the composition of the line and to sustain them at the upper as well as the lower ends I employ an upright stop-bar H. (Shown in Figs. 6 and 7.) This bar is provided with a series of laterally-projecting fingers $h$ to extend across the path of the matrices, as shown in Figs. 6 and 11, and it is secured at its lower end to a supporting-plate $h'$, mounted on horizontal pivots $h^2$, which admit of the bar being thrown to one side, as indicated in dotted lines in Figs. 6 and 11, to withdraw its teeth from the path of the matrices when the completed line is to be advanced.

The retraction of the stop-finger H is effected, as shown in Figs. 3, 5, and 6, by a finger $i$ in the lower end of an upright rock-shaft I, provided with a crank $i'$ and employed for starting the machine, as hereinafter explained.

For the purpose of advancing the assembled or composed line of matrices from the point of assemblage to the casting mechanism and thence rearward and upward to the point of distribution I employ, as in my preceding patent and as shown in Figs. 1, 2, 3, 6, 11, 14, and 15, a carrier-finger J, sustained at its top by an endless grooved guide K, fixed on top of the guide-frame. The finger stands normally, as shown in Figs. 2 and 3, at such point that it does not prevent the passage of the matrices to the assembling-point; but it hangs down between the guides and is arranged to travel between the parallel portions of the guides in such manner as to carry the assembled matrices before it.

The endless guide K is in the form of a slotted tube, within which guiding-rollers or equivalent guiding means on the upper end of the finger travel. The travel of the finger is effected by means of an endless chain L, following the course of the guide, passing around guide-pulleys $l$ and small rotary guides $l'$. It is to be understood that rollers, pulleys, or other guides of any suitable construction may be employed in connection with the chain, the only requirement being that it shall follow the course of the guide K in order that the finger may be advanced positively around the latter. The chain, which, with its finger, stands normally at rest, receives motion, as shown in Figs. 1, 2, and 29, from the lower pulley $l$ on the upper end of shaft $l^2$, which receives motion through pinion $l^3$ on its lower end and intermediate pinion $l^4$ from a pinion $l^5$ on the main driving-shaft M, mounted in the base-frame.

When the composed line is to be advanced toward the casting mechanism and when the arresting or detaining devices G and H have been withdrawn, there is liability of the matrices, which stand in an inclined position at right angles to the length of the guides, as shown in Fig. 5, dropping forward at the lower ends until they assume a vertical position, in which position it would be impossible to carry them around the curve in the guides because of their obliquity thereto. I therefore provide a yielding resistant to oppose the advance of the lower ends of the matrices in the composed line, this resistant being in the form of an endless chain N, provided with a series of laterally-projecting fingers $n$. The chain is mounted in a grooved guide $n'$ on the under side of the guide-frame and has the fingers in such number and in such relation to each other that one or another of the fingers will stand normally under the stop-finger G at the lower side or end of the composed line. The friction of the chain N in its guide is such that although its fingers $n$ will prevent the matrices from falling out of position during transference they will yield and advance before the line as the latter is carried forward by finger J. The resisting-chain N does not follow throughout the path of the carrying-finger J and the matrix-line. It follows this path along the front of the machine and up on the right side to the upper end, after which the guide and chain are carried to the right, as indicated in Fig. 3, so that as each matrix-line reaches the upper end of the machine the detaining-finger $n$ is carried laterally away from the line, leaving the matrices free to descend by gravity on the diverging portions of the guides for purposes of distribution. One of the advancing fingers $n$ restores finger H to its operative position. The essence of my invention in this regard lies in the use of a yielding resistant in advance of the matrix-line adapted to travel before the line and only when the line is forcibly advanced, so that the matrices assembled between this resistant at the front and the carrying-finger at the rear will be held in close order until they have been carried to the casting mechanism on the right side of the machine and thence to the distributing-point.

The casting mechanism, to which the composed line of matrices and spacers is presented in order that the slug or linotype may be cast against and into the matrices, comprises a mold, means for confining the composed line edgewise and lengthwise in front of the mold, means for adjusting the matrices endwise to bring their characters in exact alinement, means for advancing the spacing-wedges between the matrices to effect the elongation or justification of the line, a pump mechanism for delivering molten metal into the mold against the matrices, and means for ejecting the slug from the mold and trimming its surfaces. This mechanism is shown more particularly in Figs. 1, 2, 13, 14, 15, 23, 24, 25, &c., in which O represents a stationary block or anvil fixed to the base-frame, having on its outer right-hand face a rib $o$ in such position that when the line of matrices is carried across the front of the machine and then upward the rear the rib $o$ will enter the grooves $y^3$ in the rear edges of the matrices, as shown in Figs. 15, 17, 24, &c. Below the anvil O there is a slide $o'$, mounted on a dovetail guide in such position that when pushed forward it will act against the lower ends of the matrices and push them upward endwise, as shown in Fig. 24, until their shoulders are seated firmly against the alining-rib $o$, whereby the characters or matrices proper are brought to an exact alinement vertically. By the coöperation of the alining-rib $o$ and the alining-slide $o'$ I insure the proper positioning of the matrix characters in relation to each other vertically.

P represents the slotted mold in which the slug or linotype is cast. This mold is mounted in the upper end of a vibrating arm $p$, mounted on a horizontal shaft $p'$ in the main frame, having a rocking and an axial motion, as clearly shown in Figs. 13, 21, &c., so that it may be swung up to the operative position in front of the line of matrices, as shown in Figs. 23, 24, &c., and after the casting operation turned down to the position shown in Figs. 13, 21, 27, and 28 to permit the ejection of the slug.

The mold proper is simply a slotted block preferably built up of several pieces screwed together, and it is made with a flat forward face adapted to fit tightly against the forward edges of the alined matrices, as shown in Figs. 14, 15, 24, &c., so that the slot or mold proper will register with the characters in the matrices.

It is of course necessary that the line of matrices shall be confined endwise and kept within the predetermined length during the casting operation. For the purpose of confining the forward end of the line I provide the mold, as shown particularly in Fig. 15, with a projecting shoulder or abutment Q, (preferably integral with one of the mold-liners,) which stands in front of—that is to say, in the path of—the matrix-line as the latter is advanced by the carrier-finger J. For the purpose of confining the rear end of the matrix-line I provide, as shown most clearly in Fig. 14, a jaw or abutment R, pivoted to the frame at $r$ in such position that after the finger has advanced the matrix-line to its place in front of the mold this jaw may be turned into position behind the finger, as shown in Figs. 14 and 15. The pivoted jaw R is held firmly in place by means of a vibrating support $r'$, pivoted to the frame at $r^2$, so that when carried under the rear end of the jaw, as shown in Fig. 14, it will lock the jaw firmly. Thus it will be seen that the matrix-line is confined between the abutment Q at one end and the finger J at the other end, the finger being in turn rigidly supported by jaw R. While the matrix-line is thus confined at its two ends between the mold P and the alining plate or anvil O the justification must be effected—that is to say, the line elongated to the predetermined limit and until the matrices are closed tightly together in front of the mold—so that the molten metal may not flow between them. For this purpose a second slide T (see Figs. 13, 16, 18, 23, and 24) is mounted on the frame in position to act on the lower ends of the spacing-wedges and push them upward through the line of matrices, while the upper members or wedges are held against vertical motion by their engagement with their guide A, the effect being to widen or thicken the spaces until they expand the line to the required length limited by the abutments at the ends.

After the casting operation it is necessary that the matrices in the line, crowded tightly together by the act of justification, shall be loosened or freed preparatory to their transfer to the place of distribution. I therefore provide the justifier-slide T across its upper end with a lip $t$, adapted to engage, as shown in Figs. 13 and 18, over the lips on the lower ends of the spacer-wedges, so that when the plate T is drawn downward by means hereinafter described it will pull the wedges positively downward, thus lessening the width of the spaces and freeing the matrices. The lip $t$ is preferably bent upward at one end, as shown in Figs. 16, 17, and 23, so that as the matrix-line is moved endwise into position in front of the mold the shoulders of the wedges will ride easily under the lips.

For the purpose of supplying molten metal to the mold while it is in position against the matrices and for the additional purpose of crowding the mold against the matrices I employ a melting-pot S, arranged to vibrate on a horizontal shaft $s$ in the base of the machine, its upper end being provided with a perforated delivery throat or mouth adapted to fit tightly against the face of the mold. (See Figs. 21, 22, 23, and 24.) Within the pot I form a vertical well or cylinder $s'$, communicating with the delivery-mouth, and in this well I mount a vertical plunger $s^2$, fluted vertically at the lower end, so that when raised above the well, as in Fig. 23, the molten metal will flow through the flutes and fill the well thereunder, and that when the plunger is depressed until the flutes enter the cylinder and are closed thereby, as shown in Fig. 24, the metal will be driven positively through the mouth into the mold and against the matrices on its farther side, the effect being to produce in the mold a solid slug or linotype having on one edge in relief the type characters formed by the matrices, as usual in this class of machines.

During the passage of the matrix-line to its place between the mold and the supporting-anvil the mold stands in a retracted position, as shown in Fig. 23, while the mouth of the pot is in turn retracted from the mold. The mold is moved horizontally away from the matrices for the double purpose of releasing the matrices and of withdrawing the type characters therefrom. The pot is advanced toward the mold for the purpose of insuring a close joint between the mold and the matrices at one side and the mold and the pot at the opposite side, and the pot is retracted for the purpose of permitting the retraction of the mold and breaking the sprues at the mouth of the pot away from the base of the slug in the mold.

The mold has, as already indicated, motion in two directions—first, a horizontal motion to and from the matrices, as indicated in Figs. 23 and 24, and, second, a swinging motion in a vertical path from the casting position shown in Figs. 15, 23, and 24 downward and forward past the position shown in Fig. 25 to the position shown in Figs. 13, 21, 27, and 28 for the purpose of presenting the slug to the action of the trimming and ejecting devices. During the casting action the mold-slot stands in an inclined position parallel to the matrix-guides A; but in its final position during the ejection of the slug the mold-slot stands vertically, as shown in Figs. 13, 21, 27, &c. As the mold swinging downward approaches its final position it is carried closely past the stationary trimming-knife U, (see Figs. 13 and 25,) which, acting snugly against the rear face of the mold, shaves off the base of the slug flush with the mold, thus bringing the slug to the exact height required. At the completion of its movement the mold stands between two fixed parallel knives V and a reciprocating ejector-blade W, which, advancing at the proper time, acts against the base of the slug, as shown in Figs. 27 and 28, driving the same out of the mold and between the two knives, whereby the opposite flat sides of the slug are rendered true and parallel. The ejector-blade continues its movement through the mold and between the knives until the slug is carried into a receiving-galley B, as shown in Fig. 1, after which the ejector is withdrawn and the mold swung upward again to its operative position between the mouth of the pot and the matrix-supporting devices.

The trimming-knives V may be of any suitable construction; but they are preferably connected at their two ends by transverse screws $v$, passing through separating blocks or liners $v'$, so that the substitution of liners of different thicknesses will vary the distance between the knives to suit slugs for the various bodies, such as nonpareil, minion, &c.

In order to insure the stoppage of the mold in exact alinement with the knives and the ejector, I propose to provide an adjustable stop—such, for example, as the screw $p^3$, Figs. 25 and 27. The ejector-blade W is detachably connected with an operative slide $w$, guided in the main frame, so that blades of different thicknesses and different widths may be interchanged, according to the length and thickness of the slugs to be produced.

It will be observed that the mold P is composed of two top and bottom blocks or plates screwed to the carrying-arm $p$ by bolts $p^4$, the ends of the blocks being separated by intervening liners or spacing-pieces, one of which may be integral with the abutment Q. By substituting liners varying in length and thickness the dimensions of the mold-slot may be varied at will to suit the different requirements as to measure and body, or, in other words, as to the length and thickness of the slugs.

It is to be noted that when the mold is in the casting position it stands at an inclination, or, in other words, with one end higher than the other. Experience has shown that when the mold is thus inclined it is possible to cast solid slugs of large size with more certainty than when the mold is arranged in the usual horizontal position. When the mold is horizontal, it is a common occurrence for the air to be imprisoned in the slugs at or near the surface, thereby rendering the face of the slug or linotype imperfect or unsubstantial. When the mold is inclined, this difficulty is less liable to occur.

During the casting operation the matrix-carrying finger J and its driving-chain remain at rest; but after the casting operation is completed the melting-pot retreats, the spacing-wedges are drawn down to loosen the matrices, and the mold retreats from the matrices in order to withdraw the front of the shoulder or abutment Q from the path of the matrices, after which the chain is again set in motion and the finger J carries the line of matrices before it upward and rearward along the guides A until the upper end of the guides is reached, when the finger traveling around the upper guide-pulley $l$ carries the matrices to the descending and diverging portions of the guides A, down which the matrices pass by gravity to the rear ends of the appropriate groups held in check by the escapements E. The finger continues its downward course in a central line out of contact with the matrices and comes to rest in the position shown in Figs. 1 and 2.

The various moving parts of the machine are operated in the following manner: Power is applied primarily to the continuously-rotating clutch-pulley $m$, mounted on the end of the horizontal driving-shaft M, seated in bearings in the base-frame and intermittingly driven. The driving-shaft has at its opposite end a pinion $m'$, which engages and drives the large gear-wheel $x$ on the horizontal main shaft X, seated in bearings in the frame and carrying the principal operative cams, as shown in Figs. 1, 2, 13, 21, and 29. The clutch connecting the pulley $m$ with the driving-shaft is of the same character as that used in the commercial linotype-machines of the present day, as shown in Fig. 31, the pulley being mounted to turn loosely in the shaft and engaged internally by outwardly-moving friction-shoes $m^3$ in the ends of a cross-head $m^4$ on the shaft, these shoes being crowded outward by the levers $m^5$, jointed to a central rod $m^6$, extending into the shaft, encircled by a spring, which tends to pull it inward and thereby to cause the engagement of the shoes, so that the shaft will turn with the pulley. The central rod is connected through slots in the shaft with an external collar $m^7$. (See Figs. 13, 29, and 31.) The clutch is held normally out of action, as shown in Fig. 29, by a lever $m^8$, pivoted to the frame and acting at one end against the clutch-controlling collar $m^7$. At its opposite end this lever is acted upon by one end of an angular dog $m^9$, pivoted in the lower end of a rock-shaft $m^{10}$, mounted in the frame. The opposite end of this dog is acted upon at the proper time by a cam or projection $m^{11}$ on the side of cam-wheel $o^7$, mounted on the main shaft X. One revolution of the shaft X completes all the operations incident to the production of a slug, and when the rotation is complete the shoulder $m^{11}$ engages the dog $m^9$, as shown in Fig. 29, raising its horizontal end and causing its lower end to move the stop-lever $m^8$ and throw the clutch out of action, thus arresting the movement of all the power-driven parts.

To start the machine, it is only necessary to turn the shaft $m^{10}$ against the resistance of the encircling spring $m^{12}$ until the upper arm of the dog $m^9$ is thrown out of the path of the actuating-shoulder $m''$, whereupon the dog will release the lever, the clutch will automatically engage, and the main shaft will start. The rotation of the shaft $m^{10}$ is effected by hand by the same act that releases the composed line of matrices. To this end the rock-shaft $m^{10}$ is provided at the upper end with an arm $m^{14}$, acted upon by an arm $i^6$ on the lower end of the shaft I, which, it will be remembered, is operated by a hand-crank for the purpose of withdrawing the stops from the path of the matrices, as shown in Figs. 3, 5, and 6. It will be seen, therefore, that the movement of the hand-crank $i'$ by turning the shaft I serves the double purpose of withdrawing the stops G and H from the forward end of the composed line of matrices and of setting the driving devices in motion, so that the released line of matrices will be moved forward to the casting mechanism by the advancing finger J. The driving-chain for finger J receives motion, it will be remembered, from sprocket-wheel $l$, which, as shown in Fig. 29, is mounted on shaft $l^2$, provided at the lower end with a beveled pinion $l^3$, receiving motion through an idle pinion $l^4$ from pinion $l^5$ on the main shaft M. The pinion $l^5$ is mounted loosely on the shaft, but connected thereto by a sliding clutch $l^6$, controlled by a lever $l^7$, acted upon by spring $l^8$, which keeps the clutch normally in engagement, so that the matrix-carrying finger remains in motion. In order that the finger may be automatically arrested in its movement when the matrices reach the casting position in front of the mold, I provide a cam-surface $l^9$ on the side of a cam $r^8$, secured on the main shaft X, this cam-surface being so located and of such length that it will, through the lever $l^7$, disengage the clutch and stop the finger of the driving-chain as soon as the matrices have reached the casting position and keep the clutch out of action until the casting operation has been completed, whereupon the clutch will be permitted to reëngage and the chain and finger will continue their movement until the matrices have been carried from the casting position upward to a point from which distribution takes place automatically, the motion of the finger being continued until it arrives at its normal position of rest, (shown in Fig. 3,) when it is automatically stopped by the dog $m^9$ and its connections above described.

It will be understood from the foregoing that the machine is started by the hand-crank $i'$ throwing the stop-dog $m^9$ out of action, and thereby allowing the clutch to engage, that the parts which drive the chain continue in motion until the matrix-line arrives at the mold, and that they are again arrested by the action of cam $l^9$, which permits them to again start at the completion of the casting action, the motion being continued until they are again stopped in the final position by the shoulder $m''$ and stop-dog $m^9$.

In order that the operator may arrest the machine at any stage of its operation, I provide, as shown in Fig. 29, a crank-shaft $m^{13}$, the lower end of which is arranged to act on the stop-lever $m^8$.

The jaw or abutment R, confining the rear end of the matrix-line in front of the mold, is actuated, it will be remembered, as shown in Fig. 14, by the vibrating arm $r'$, which assumes a position between the rear end of the dog and a solid portion of the frame, thus carrying the dog to its closed position and holding it firmly in place against the stress of spring $r^3$, which tends to pull it open. The arm $r'$ is actuated through link $r^4$ by arm $r^5$ on rock-shaft $r^6$, having a second arm $r^7$, acted upon by the periphery of cam $r^8$ on the main shaft. The cam acts through the intermediate parts to pull the jaw-supporting arm $r'$ positively to its place. As the cam in the course of its revolution releases the arm the parts are returned and the jaw released by a spring $r^9$, connecting the arm $r^5$ with the frame. This jaw-operating cam $r^8$ carries on its side the clutch-controlling cam $l^9$, heretofore referred to.

The mold receives its swinging motion between the casting and the ejecting position, as shown in Figs. 13 and 21, through a link $p^6$ from lever $p^7$, mounted on a horizontal axis in the base-frame, subject to the action of a lifting-spring $p^8$ and a depressing-cam $p^9$ on the main shaft, the cam being so formed and timed as to hold the mold at rest in its respective positions during the casting and the ejecting operations.

The face of the melting-pot is provided with a stop-shoulder $s^4$, (see Figs. 21, 22, &c.,) against which the mold seats itself under the influence of the spring $p^8$, this arrangement insuring the exact alinement of the mold with the row of openings in the pot-mouth. The horizontal motion of the mold to and from the matrix-line is effected through the endwise motion of its supporting-shaft $p'$, which, as shown in Fig. 21, is connected through lever $s^5$ and link $s^6$ to the vibrating-pot frame, so that as the pot swings forward the mold will be advanced toward the matrices and that as the pot swings backward the mold will be retracted from the matrices, but at a speed less than that of the pot, so that the pot is drawn away from the back of the mold while the front of the mold is retreating from the matrices and withdrawing the edge of the contained slug therefrom. The pot receives its vibrating motion around the horizontal supporting-shaft $s$ through a lever $s^7$, acted upon by a cam $s^8$ on the main shaft X. The lever $s^7$ is mounted loosely on the pot-supporting shaft and is connected with an arm projecting from the lower part of the pot through an intermediate spring $s^9$ and a vertical rod $s^{10}$, so that when the cam applies pressure to the lever this pressure is communicated through the yielding spring to the pot, the mouth of which is thus held with spring-pressure against the mold. When the cam releases the lever, the pot falls back away from the mold by gravity. A spring $s^{26}$ may be used to insure the movement. The pot plunger or piston $s^2$ has its upper end connected (see Figs. 21, &c.) with an actuating-lever $s''$, which is urged downward by rod $s^{12}$, encircled by spring $s^{16}$, bearing downward on a collar thereon to effect the depression of the plunger. The lifting of the plunger is effected by a lever $s^{14}$, mounted at one end in the main frame and connected at the opposite end with a rod $s^{13}$, this lever being provided at an intermediate point in its length with a roller $s^{15}$ and acted upon by cam-surfaces $s^{16}$ in the side of the cam $s^8$.

The ejector-blade W is actuated through its carrying-slide $w$, as shown in Figs. 1 and 27, by a link $w^2$, connected with the upper end of lever $w^3$, mounted loosely on one end of the pot-supporting shaft $s$ and receiving motion through a rod $w^4$, acted upon by cam-surfaces on the inner face of the large gear-wheel $x$, as shown in dotted lines in Fig. 1, the form of these cam-surfaces being such that the ejector-blade is held at rest in its retracted position except when the mold is in position to permit ejection of the slug, at which time the ejector-blade is advanced and quickly withdrawn.

The justifier-slide T, actuating the justifying-wedges, is operated, as shown in Figs. 17, 18, 19, and 20, through the connecting-link $t^2$ from lever $t^3$, pivoted at one end and connected at the middle by link $t^4$ to a lever $t^5$, which is subjected to the action of a lifting-spring $t^6$ and a depressing-cam $t^7$, mounted on the main shaft X. Through the greater part of its periphery the cam is smooth and is adapted to hold the slide in its lower position; but through a short distance the periphery is stepped or notched, each notch being nearer the center of motion than its predecessor. The effect of this construction is to cause the justifier-slide T to drive the wedges upward through the line at the proper time by a succession of light taps or blows on the lower end, each blow driving the wedge a little farther than the previous one. It will be observed that the lip of the driving-slide is so formed as to allow a little lost motion between the slide and the wedges in a vertical direction, so that although the slide is repeatedly lowered preparatory to the next blow it does not withdraw the wedge. The cam permits the wedges after they have been driven home to remain subject to the pressure of the lifting-slide under the influence of spring $t^6$ until after the casting operation, when the cam acts to positively lower the slide, pulling the wedges down to their original positions and leaving the matrix-line free, the slide remaining in the lower position until the next line of matrices is in position to be justified.

The alining-slide $o'$, by which the matrices are pushed up against the rib or shoulder $o$ on the anvil O, is actuated by a mechanism practically identical with that used for operating the justifying-slide, slide $o'$ being connected through link $o^2$ to lever $o^3$, which is centrally pivoted, and connected by link $o^4$ to lever $o^5$, acted upon by lifting-spring $o^6$ and by the stop-depressing cam $o^7$. This cam is so formed that the slide is held normally down in the position shown in Fig. 19 to permit the free travel of the matrices to and from the casting position. When, however, the line is in position to be alined, the step portion of the cam comes into action and the slide $o'$ rises repeatedly against the lower ends of the matrices.

The stops or shoulders of the justification-cam and those of the alining-cam are preferably arranged to act alternately and so that justification is partly effected before the final action of the alining-slide.

The operation of the machine is as follows: The matrices and spaces being suspended in groups on the guides A and held back by the escapements E, the operator depresses the finger-keys D, representing the respective characters and spaces, in the order in which they are to appear in print. The depression of each key is followed by the operation of the corresponding escapement E and the release of a space or matrix. The spaces and matrices descend the converging portion of the guides and are assembled side by side in a compact line near the front of the machine and at the middle, the line being arrested and held as composition progresses by the resistants G and H. When the composition of the line is completed, or, in other words, when it is of such length that it is impossible to add the characters for an additional word or syllable within the predetermined length, the operator moves the crank $i'$, causing the shaft I to withdraw H and at the same time throw into action in the manner illustrated in Fig. 29 the mechanism for driving the chain L, carrying the finger J, so that the finger J advances in a downward and forward direction against the matrix-line, pressing it forward past the yielding resistant G and carrying it thence across the front of the machine and upward and rearward at the right until the line stands edgewise between the mold and the anvil O and endwise between the finger J and the abutment Q on the mold, whereupon the chain and finger are automatically arrested. During this advance of the matrix-line the lower end is held in check and the matrices prevented from swinging forward by one or another of the fingers $n$ on the chain N. As soon as the matrices have reached their position in front of the mold the jaw or abutment R (see Figs. 14 and 15) closes behind the carrying-finger J to give it firm support against the line. The mold closes toward the matrices to confine them edgewise against the supporting-anvil at the rear, the alining-plate $o'$ ascends repeatedly to effect the alinement of the matrices endwise against the shoulder on the anvil, and the justifying-slide T ascends repeatedly to drive the spacing-wedges through the line until the latter is crowded out to the predetermined length between the abutment Q and finger J. The mold closes tightly against the front edge of the matrices, and the pot closes tightly against the back of the mold, after which the pump-lever $s''$ is actuated and the molten metal driven from the pot into the mold, filling the same and producing the slug or linotype, which has the type characters produced in relief on its edge by the matrices which for the moment close the front of the mold. The pot retreats from the mold and the mold retreats from the matrices and then swings downward to the front, carrying the base of the slug past the trimming-knife U, by which it is reduced to the proper height, and finally presenting the slug directly in front of the ejector, which, advancing from the right, delivers the slug from the mold and between the two trimming-knives, which determine its thickness, into the receiving-galley beyond. Immediately after the casting operation is completed the chain L is automatically started and the finger J advances the line of matrices to the upper end of the guides A, turning it to the left until the descending-point is reached, whereupon the matrices pass by gravity to their original positions, or, in other words, to the rear ends of the respective groups held in check by the escapements E. The matrix-carrying finger J continues its motion until it arrives at the position shown in Figs. 1, 2, and 3, when it is automatically brought to rest.

While the machine herein described and illustrated is designed with special reference to the use of female dies or matrices and to the use of molten metal, it is to be distinctly understood that all the assembling, distributing, alining, and clamping devices are equally adapted for use in machines in which cameo dies or dies in relief are employed to indent their characters into lead, papier-mâché, or other equivalent material for the purpose of producing line-matrices from which linotypes are to be cast in a manner well understood in the art.

Having described my invention, what I claim is—

1. In a linotype or analogous machine and in combination with a matrix-supporting guide extending on both sides thereof, a sustaining-plate $a$ forming a continuation of the guide, substantially as described.

2. In a linotype or analogous machine, the wire guides A, having their ends sustained within plates $a$ forming continuations of the guides.

3. In a linotype-machine, a series of guides A, sustaining-plates $a$, intermediate washers $a^2$, and means for binding them together in series.

4. In a linotype or analogous machine, a series of matrix-guides A, lying one above another, their supporting-plates $a$, intermediate washers $a^2$, and a confining-bolt C, extended through the series of washers and plates.

5. In a linotype-machine, a series of matrix-guides A, arranged in two parallel vertical tiers, that dependent matrices may travel between them, in combination with supports for said guides, and two vertical rods C passing through the supports of the respective tiers and connected at their lower ends at a distance from the lowermost guide, whereby the two tiers are held in proper relations but a free passage afforded for the matrices extending below them.

6. In a linotype or analogous machine, an endless matrix-guide consisting of a wire A, sustained at different points in its length by a plate $a$, shaped to encircle the wire and form a continuation thereof.

7. In a linotype-machine having a series of endless diverging and converging guides, substantially as described, a carrier-finger J and the tubular slotted guide for said finger, overlying the matrix-guides and secured thereto.

8. In a linotype-machine and in combination with matrix-guides A, supporting-plates $a$, means for maintaining the separation of said plates, top and bottom frames $a^4$, and vertical bolts C binding said parts together in one rigid structure.

9. In combination with the guides A, their supporting-plates $a$, the top and bottom frames $a^4$, and vertical bolts C binding said parts together, with arched top connections $k^4$.

10. In combination with the endless guides A, the top frame $a^4$, the matrix-carrying finger J, its tubular guide K, and the arched connections $k^4$ sustaining said guide and connected to the top frame.

11. In a linotype-machine, matrix-sustaining guides extending downward in converging lines and continued in parallel tiers downward, laterally, and upward, in combination with the means for arresting the released matrices in line at one point between the guides, a casting mechanism to coöperate with the assembled matrices at a distance from the point of assemblage, and mechanism for transferring the assembled or composed matrices from the point of assemblage along the guides to the casting mechanism.

12. In a linotype-machine, endless matrix-sustaining guides, means for assembling the selected matrices at one point in the length of the guide, means for transferring the assembled line from the point of composition, and a casting mechanism to which the assembled line is transferred.

13. In a linotype-machine, the combination of a series of inclined endless guides, converging and diverging for a portion of their length, means for releasing the selected matrices, that they may descend by gravity to the point of assemblage, means for arresting the matrices at such point, casting mechanism adjacent to the guides at a point remote from the point of assemblage, and means for transferring the assembled line first to the casting mechanism and thereafter to the upper rear portion of the guides, that the matrices may descend the converging portions of the guides and be distributed to their first positions.

14. In a linotype or analogous machine and in combination with the inclined guides whereon the matrices are suspended and whereon they descend by gravity, a yielding resistant to control the advance of the lower ends of the assembled matrices.

15. In a linotype or analogous machine, in combination with inclined guides whereon matrices are suspended and arranged to travel, means for maintaining the matrices in inclined positions at substantially right angles to the length of the guides during their downward travel thereon.

16. In a linotype or analogous machine, endless guides whereon suspended matrices travel from the points of storage to the assembling-point, thence to the casting-point, and finally back to the starting-point, in combination with means acting behind the assembled or composed line of matrices to advance the same along said guides from the point of assemblage or composition, and a yielding resistant arranged to act in front of the assembled line to hold the same in compact order as it is advanced along the guides.

17. In a linotype or analogous machine, endless guides whereon suspended matrices are arranged to travel, in combination with an endless power-driven chain, a finger carried thereby to advance the assembled matrices along the guides, and a second endless chain having fingers or projections to resist the advance of the assembled matrices along the guides, whereby the assembled line of matrices is held in compact order while being carried positively along the guides.

18. In a linotype or analogous machine, a series of endless guides whereon suspended matrices are arranged to travel, said guides arranged in converging and diverging lines, as described, in combination with the upper chain and its matrix-carrying finger and the lower chain and its matrix-resisting finger, said chains arranged to follow the guides for a portion of their length only, whereby the matrices are released from the influence of the fingers to permit their distribution and assemblage.

19. In a linotype or analogous machine, a series of inclined, downwardly-converging guides, grouped at their lower ends in two vertical tiers, in combination with suspended matrices arranged to descend said guides by gravity, means for holding the matrices and releasing them individually that they may descend the respective guides, and retractable stop devices, arranged at the lower end of the guide in the path of the descending matrices, whereby the matrices are caused to assemble in line and the subsequent release of the line permitted, that it may advance along the guides.

20. In a linotype or analogous machine, a series of inclined guides, matrices suspended on said guides and arranged to descend by gravity, in combination with means for holding an assembled line of matrices compactly together during their travel downward along the guides.

21. In a linotype or analogous machine, a series of guides extending downward toward the front and curved horizontally to one side, in combination with matrices suspended from said guides, and means acting in advance of the matrices for holding them in positions at substantial right angles to the length of the guides during their travel along the same, whereby they are prevented from binding as they pass along the curved portions of the guides.

22. In a linotype or analogous machine, the series of endless matrix-sustaining guides, arranged in two parallel tiers for a portion of their length and in converging and diverging lines for the remainder of their length, in combination with finger-keys and escapement devices for holding and releasing the matrices, means for arresting the released matrices that they may be assembled in line, means for advancing the composed line along the guides, clamping devices to which the line is presented, a mold coöperating with the line, a melting-pot coöperating with the mold, and means for delivering metal from the pot into the mold.

23. In a linotype or analogous machine, a series of endless matrix-sustaining guides, substantially as described, in combination with a finger for advancing the assembled matrices along the guides, and means for intermittingly advancing said carrier and arresting its motion at two predetermined points.

24. In combination with guides, suspended matrices arranged to travel thereon, means for clamping the assembled matrices compactly together, and means for advancing the line of assembled matrices from the place of assemblage along the guides and into the field of the clamping devices.

25. In combination with a series of guides having an upward inclination, matrices suspended therefrom, a casting mechanism adjacent to the guides, comprising a mold, matrix-clamping devices and a pot for delivering molten metal, and means for advancing the assembled matrices upward along the guides to the casting mechanism.

26. In a linotype-machine, the endless inclined guides, traveling matrices suspended therefrom, a casting mechanism having its operative parts arranged at an inclination corresponding to that of the guides, and means for carrying the matrices upward to the casting mechanism.

27. In a linotype-machine, a casting mechanism, a series of coöperating matrices and a series of continuous guides from which the matrices are suspended and along which they travel, said guides approaching the mold from one end and continuing past the same beyond its opposite end, whereby the matrices are guided to the mold, sustained in front of the same and guided away therefrom without changing their course of travel.

28. In a linotype-machine, in combination with guides whereon traveling matrices are suspended, the carrier-finger J to advance the assembled matrices to the mold, and a jaw or abutment acting behind said finger to support the same and assist in confining the assembled matrices.

29. In a linotype-machine, the combination of a mold having a shoulder or abutment Q to sustain one end of the composed line of matrices, and a matrix-carrier J arranged to act against the opposite end of the matrix-line.

30. In a linotype-machine, the mold provided with the shoulder or abutment Q to confine one end of the matrix-line, the carrier J arranged to bear at the opposite end of the matrix-line, and a jaw or abutment R to sustain said finger while the matrices are in action.

31. In a linotype-machine, in combination with means for presenting the matrices in front thereof, a mold having a shoulder or abutment to confine one end of the matrix-line, and means for moving the mold to and from the matrices, whereby it is caused to effect the confinement and release of the matrices.

32. In a linotype-machine, the combination of the matrices, notched or shouldered in one edge, a fixed anvil having a rib to engage the matrix-shoulders, a mold acting against the matrices in opposition to the anvil, and the reciprocating alining-plate acting repeatedly on the ends of the matrices to seat their shoulders against the anvil and effect exact alinement of the characters.

33. In a linotype-machine, the combination of the ribbed anvil O, matrices Y, mold P, and reciprocating alining-plate $o'$ arranged to act repeatedly on the ends of the matrices.

34. In a linotype-machine and in combination with shouldered matrices, an anvil ribbed or shouldered to engage the matrices, a mold opposing the anvil and acting against the matrices, an alining-plate $o'$ to adjust the matrices endwise, and means for imparting repeated reciprocations to said plate prior to each casting operation.

35. In a linotype-machine, the combination of a series of matrices, a series of two-part wedge spacers assembled therewith, means for confining the line of matrices and spacers, a space-actuating device adapted to engage the movable members of the spacers with lost motion between, and means for advancing the actuating device by successive steps to effect justification and thereafter retracting the device to loosen the spacers.

36. In a linotype-machine, wedge spacers consisting of members connected by a sliding joint, in combination with an actuating device engaging the movable member of the space and having a limited end play in relation thereto, whereby the space is permitted to remain at rest between the successive blows of the actuating device.

37. In a linotype-machine, a two-part wedge spacer Z, substantially as described, in combination with a reciprocating actuating device T, having a transverse rib or lip engaging loosely over a shoulder or lip on the movable member of the spacer, whereby the actuating device is adapted to impart successive blows to the spacer to advance the same and justify the line, and also adapted to thereafter effect the positive retraction of the spacing member through the line.

38. In a linotype-machine, in combination with notched or shouldered matrices Y, an anvil having an alining-rib to engage them, a reciprocating device acting on the ends of the matrices to insure the seating of their shoulders against the anvil, a series of two-part wedge spacers, and a reciprocating slide or actuating device engaging said spacers.

39. In a linotype-machine, the ribbed anvil O, the mold arranged in opposition to the same, the intermediate shouldered matrices, and the two-part wedge spacers, in combination with the alining-slide $o'$, the space-actuating slide T, and means for imparting repeated reciprocations to each of said slides previous to each casting action.

40. In a linotype-machine, the fixed anvil O, the alining-slide $o'$ mounted thereon, and the space-actuating or justifying-slide T, mounted on the first-named slide.

41. In a linotype-machine, the combination of a fixed anvil to sustain the matrices at one edge, the opposing mold to act against the opposite edge of the matrices, the mold-supporting arm P, a shaft supporting said arm, means for imparting to the shaft a rocking motion and also an axial motion, whereby the mold is moved into and out of the field of operation and also moved to and from the matrices a melting-pot having a delivery-mouth to coöperate with the mold, and means for moving said pot to and from the mold.

42. In a linotype-machine, in combination with fixed means for confining the matrices on one side means for delivering metal from the opposite side, an intermediate mold P, having shoulders or abutments to limit the length of the matrix-line, its carrying-arm, the shaft supporting said arm, and means for imparting to said shaft a rotary reciprocation and also an axial reciprocation.

43. In a linotype-machine, the finger J for advancing and sustaining the matrix-line, in combination with the jaw or abutment R, the swinging finger $r'$ actuating said abutment, and means for vibrating the finger.

44. In a linotype-machine, the finger J for advancing and sustaining the matrix-line, in combination with the pivoted abutment R, lever or finger $r'$, and its actuating devices, consisting of the spring for retracting it and the lever and cam for advancing it.

45. In a linotype-machine and in combination with the mold mounted to vibrate around a center, the coöperating melting-pot having the stop or shoulder $s^4$ to determine the operative position of the mold.

46. In a linotype-machine, the combination of the swinging pot-supporting frame, the mold-supporting shaft mounted to slide in said frame, and connections substantially as described between said frame and shaft, whereby the motion of the frame is caused to effect the motion of the shaft therein.

47. The swinging pot-support, in combination with the mold-supporting shaft $p'$ therein, the lever $s^5$, the fixed support for said lever, and the link $s^6$ connecting the lever with the pot-support.

48. In combination with means for advancing an assembled line of matrices intermittingly in one direction to and from the mold, a mold having a shoulder or abutment to sustain the forward end of the matrix-line during the casting operation, and means for retracting the mold to withdraw its shoulder from the path of the matrices, that they may be carried from the mold after the casting operation.

49. In a linotype-machine and in combination with side trimming-knives V, a mold, a vibratory arm carrying said mold into position in front of the knives, and an adjustable stop $p^3$, controlling the final position of the mold in relation to the knives.

50. In a linotype-machine, the combination of a series of continuous guides and matrices suspended therefrom, means for advancing an assembled line of matrices intermittingly along said guides, the casting mechanism adjacent to the guides at a point where the matrix-line is stopped, and clamping devices acting to confine the matrix-line endwise in the casting mechanism, said clamping devices movable into and out of the path of the matrices, whereby the matrices, traveling always in one direction, may be advanced to the casting mechanism, arrested in position to coöperate therewith, and finally removed therefrom.

51. In a linotype-machine, the combination of a casting mechanism, comprising a series of continuous guide-wires, the matrices suspended therefrom matrix-clamping devices, a slotted mold and means for supplying the mold with metal, means for advancing the composed line of matrices lengthwise of the mold in operative position in front thereof, and thereafter carrying the line of matrices away from the mold lengthwise thereof, their travel to and from the mold being in the same direction.

52. In a linotype-machine, the melting-pot with the well or cylinder therein, in combination with the metal-delivering plunger, fluted for a portion of its length only.

53. In a linotype-machine having guides along which pendent matrices travel, in combination with means for arresting the matrices on said guides during the composition of the line, a driving mechanism for advancing the composed line and a starting device arranged to cause the withdrawal of the arresting device and the action of the driving mechanism.

54. In a linotype-machine and in combination with the inclined guides, the retractable matrix-stop H and the yielding stop G.

In testimony whereof I hereunto set my hand, this 9th day of February, 1901, in the presence of two attesting witnesses.

JOHN R. ROGERS.

Witnesses:
W. A. McCALL,
EDWARD TRACK.